(12) United States Patent
Plankell

(10) Patent No.: US 7,141,736 B2
(45) Date of Patent: Nov. 28, 2006

(54) APPARATUS FOR MOUNTING A TELEPHONE OR OTHER CORDLESS DEVICE IN A BUILDING STRUCTURE AND RELATED METHODS

(76) Inventor: Gary Dean Plankell, 9346 Lake Hickory Nut Dr., Winter Garden, FL (US) 34787

( * ) Notice: Subject to any disclaimer, the term of this patent is extended or adjusted under 35 U.S.C. 154(b) by 31 days.

(21) Appl. No.: 10/734,569

(22) Filed: Dec. 12, 2003

(65) Prior Publication Data

US 2005/0126812 A1 Jun. 16, 2005

(51) Int. Cl.
*H02G 3/08* (2006.01)

(52) U.S. Cl. .............................. 174/50; 174/53; 174/58; 174/57; 220/3.2; 220/3.3; 248/906

(58) Field of Classification Search ................. 174/50, 174/48, 49, 53, 57, 58, 17 R, 59; 220/3.2, 220/3.3, 3.4, 3.5, 3.6, 3.7, 3.8, 3.9, 4.02; 248/906; 439/535, 536; 379/428.01, 428.02, 379/428.03, 428.04
See application file for complete search history.

(56) References Cited

U.S. PATENT DOCUMENTS

| | | | | |
|---|---|---|---|---|
| 3,622,029 | A | * | 11/1971 | Ware .......................... 220/3.7 |
| 3,690,501 | A | * | 9/1972 | Ware ............................ 174/57 |
| 3,749,815 | A | * | 7/1973 | Boatwright et al. .......... 174/66 |
| 3,927,785 | A | * | 12/1975 | Kinney et al. ................. 174/53 |
| 3,980,197 | A | * | 9/1976 | Ware .......................... 220/3.8 |
| 4,062,470 | A | * | 12/1977 | Boteler ........................ 220/3.3 |
| 4,151,926 | A | | 5/1979 | Kinney et al. |
| 4,613,728 | A | * | 9/1986 | Lathrop ........................ 174/53 |
| 4,758,687 | A | * | 7/1988 | Lathrop ........................ 174/53 |
| 4,988,832 | A | | 1/1991 | Shotey |
| 5,189,259 | A | * | 2/1993 | Carson et al. ................. 174/57 |
| 5,243,134 | A | | 9/1993 | Nattel |
| 5,257,946 | A | | 11/1993 | MacMillan et al. |
| 5,289,934 | A | * | 3/1994 | Smith et al. .................. 220/3.7 |
| 5,419,716 | A | * | 5/1995 | Sciammarella et al. ..... 439/535 |
| 5,574,256 | A | | 11/1996 | Cottone |
| 5,596,174 | A | * | 1/1997 | Sapienza ....................... 174/57 |
| 5,621,788 | A | * | 4/1997 | Eiken .......................... 379/147 |
| 6,207,895 | B1 | * | 3/2001 | Engel ............................ 174/53 |
| 6,229,087 | B1 | | 5/2001 | Archer |

* cited by examiner

*Primary Examiner*—Angel R. Estrada
(74) *Attorney, Agent, or Firm*—Allen, Dyer, Doppelt, Milbrath & Gilchrist, P.A.

(57) ABSTRACT

An apparatus for mounting a cordless device in a building or furniture structure to provide reduced wiring visualization and exposure, and methods for mounting, installing, and using such apparatus are provided. An embodiment of the apparatus includes a base housing having a base open front, a base backwall, a plurality of base sidewalls, and a base inner chamber. The base open front provides access to the base inner chamber and is sized large enough to allow the passage into and storage in the inner chamber of a combination of an alternating current power plug, an alternating current power cord, at least one male telephone jack connector, and a telephone cord. The apparatus also includes a power outlet housing connected to a base sidewall, the position of which thereby reduces overall depth of the apparatus within the building or furniture structure.

46 Claims, 8 Drawing Sheets

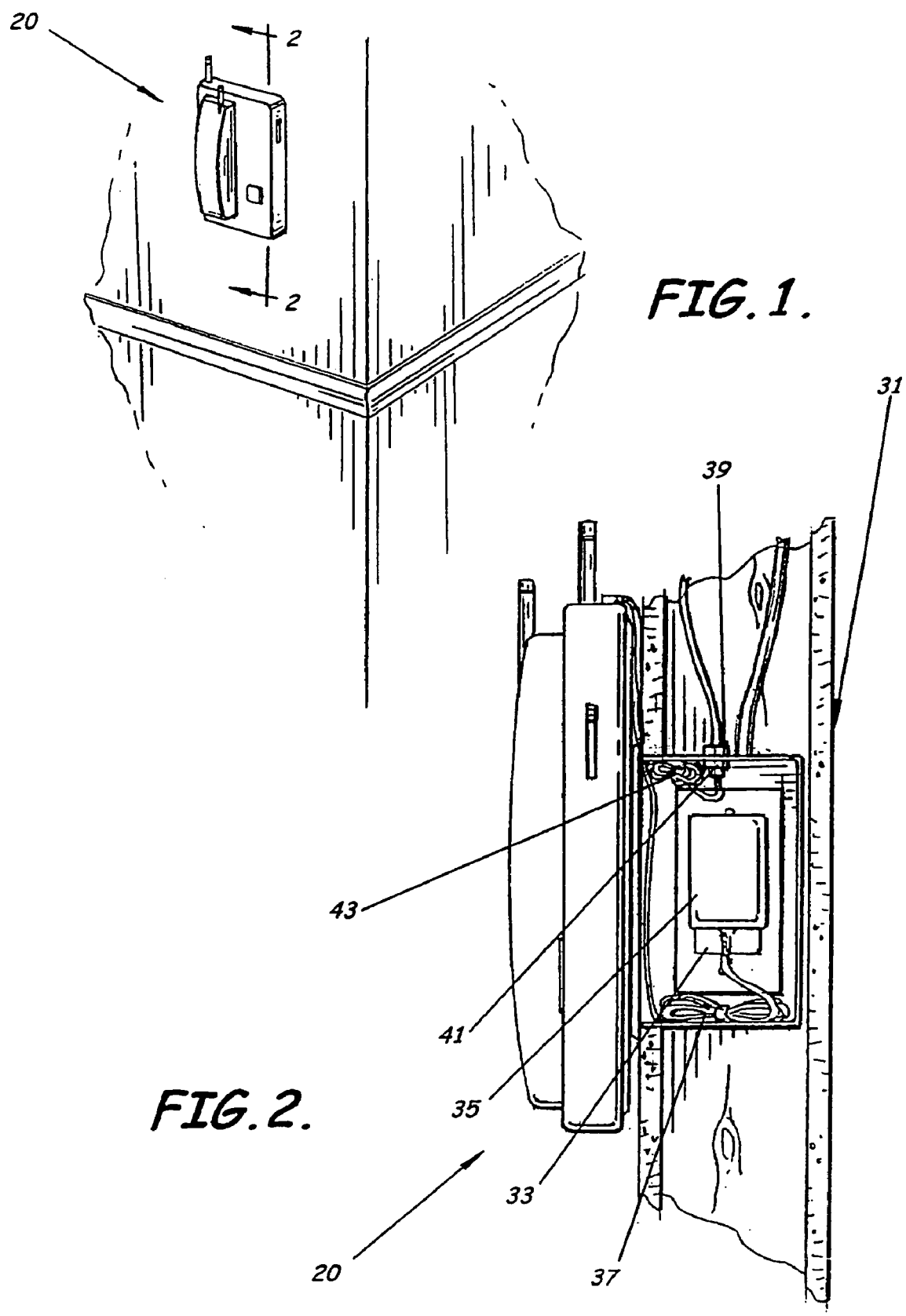

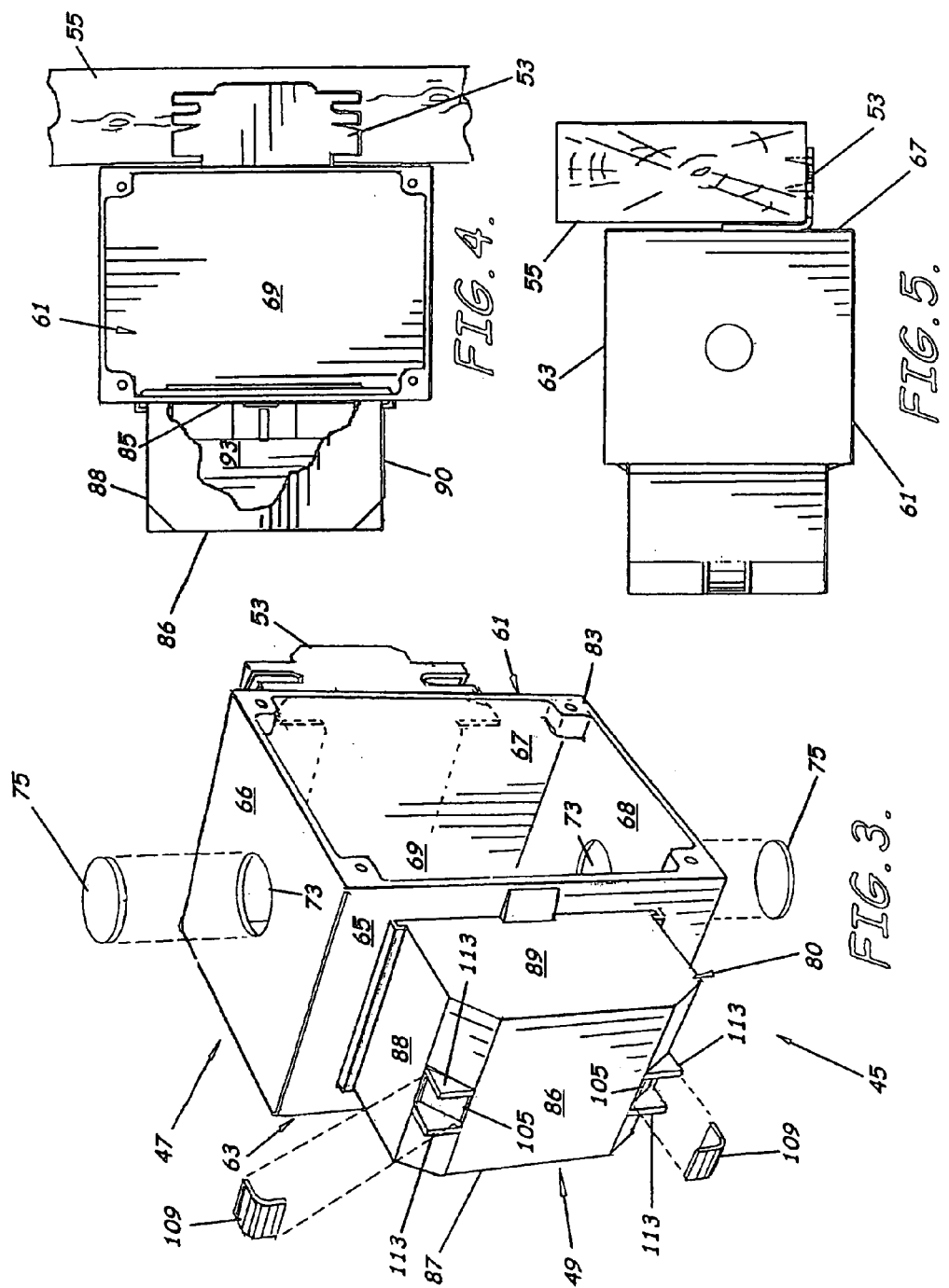

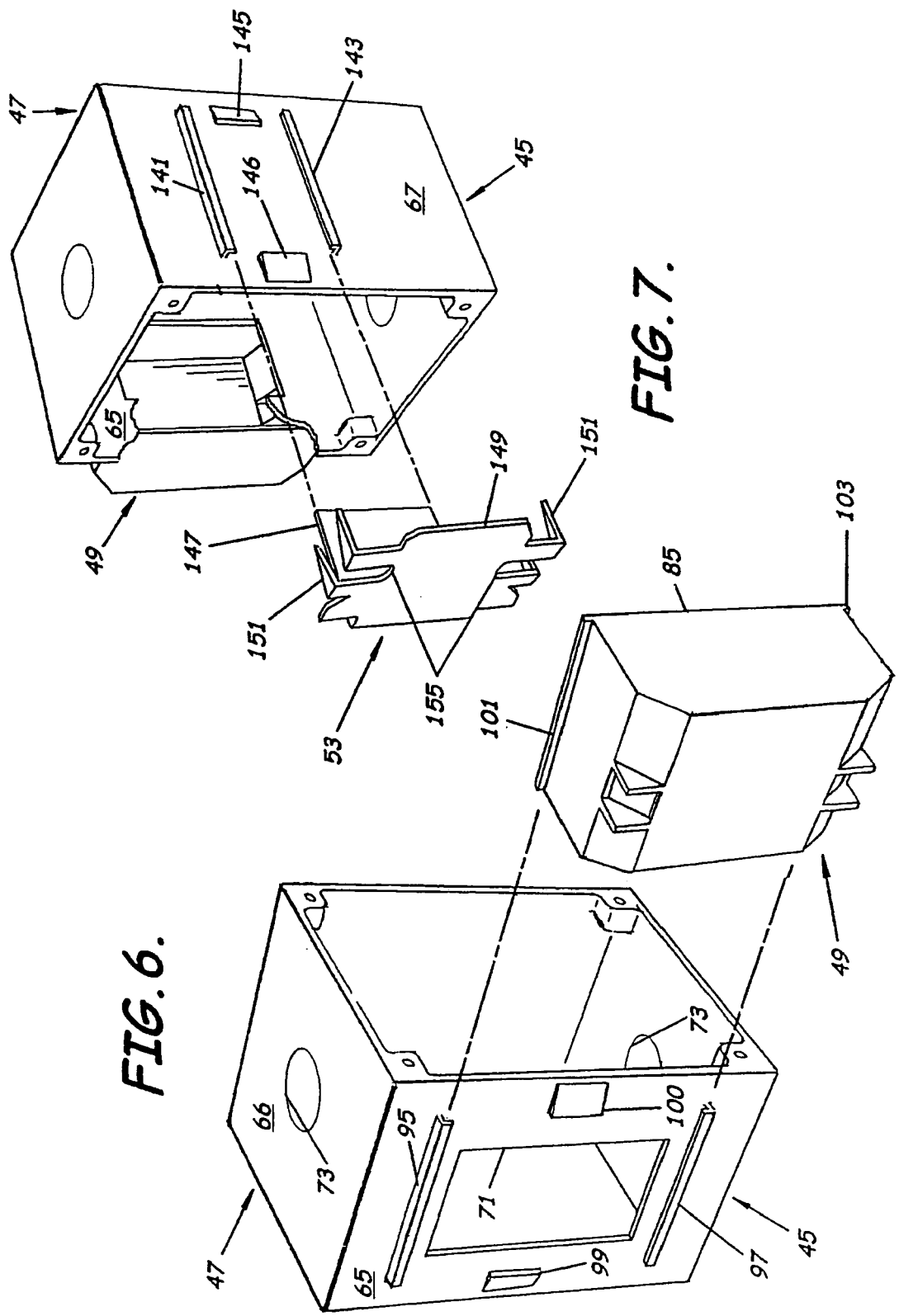

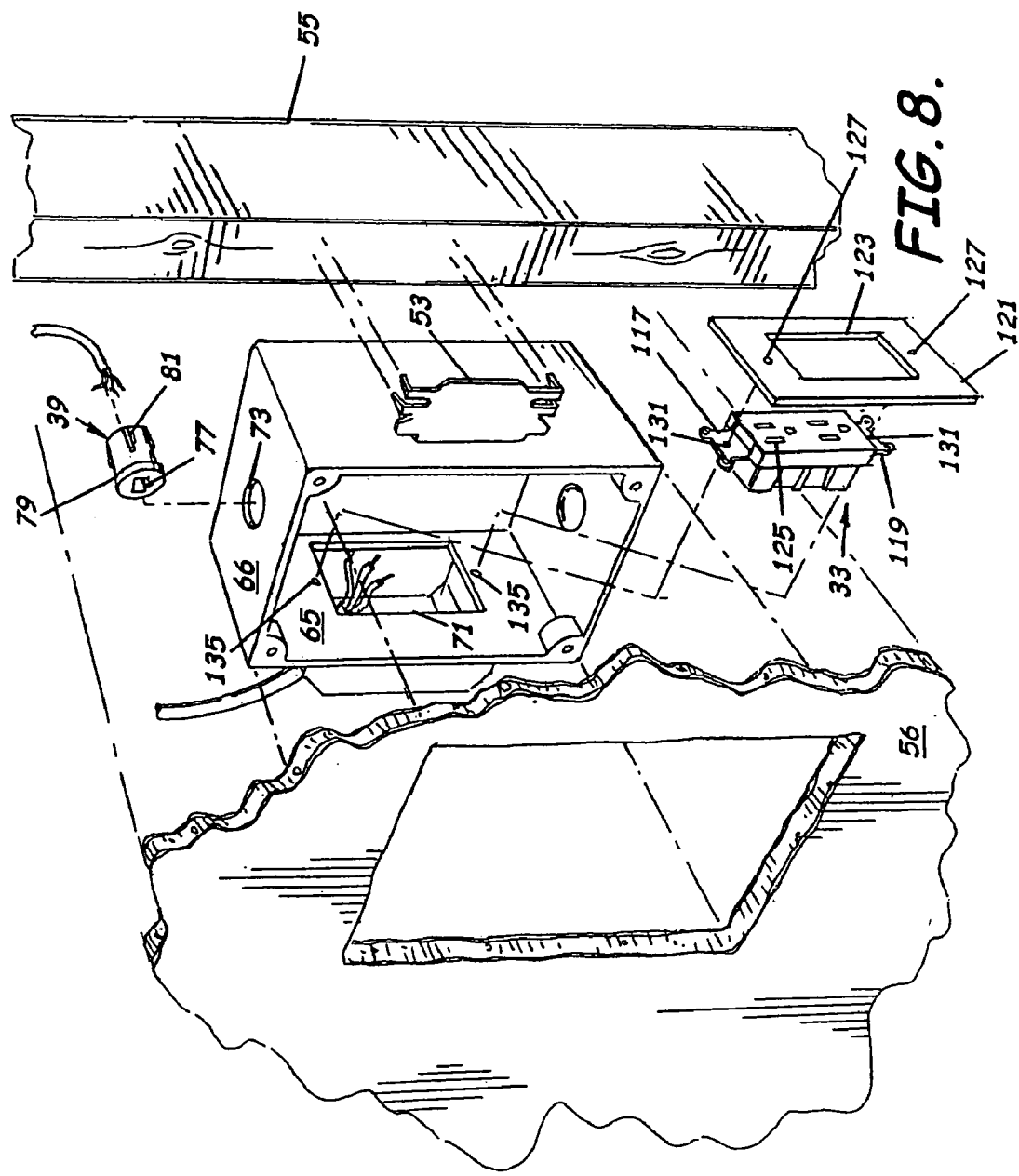

APPARATUS FOR MOUNTING A TELEPHONE OR OTHER CORDLESS DEVICE IN A BUILDING STRUCTURE AND RELATED METHODS

BACKGROUND OF THE INVENTION

1. Field of the Invention

The present invention relates generally to recessed electrical outlets, particularly wall mounted combination recessed electrical and telephone outlets. In more specific aspects, the present invention relates to a telecommunication and cordless device mounting apparatus and related methods.

2. Description of the Related Art

As a result of the rapid evolution of mobile communication equipment such as cordless telephones, the need for alternating current electrical power in conjunction with a telephone connection has increased. Cordless devices such as cordless telephones typically include a "base station" which includes a receptacle for low voltage alternating current or direct current electrical power and a telephone connection jack. The base station also often includes a pair of slots and wall mounting screws to mount the base station vertically on a wall for easy access. The second part of the cordless phone includes a "handset" that is battery-operated and charged from the base station. Typically, separate electrical outlets and telephone connection outlets are generally spaced apart to receive respective separate electric power cords and telephone cords running from the base station of the cordless phone. Each of the separate electrical outlets and telephone connection jacks is generally mounted flush with an adjacent wall surface. Such mounting necessitates that electrical plugs and telephone jack connectors extend outwardly from the surrounding wall surface, and the respective electric power cord and the telephone cord be strung to the base station. The wiring is especially visually obtrusive where the base station is mounted to the building wall. Also, due to the nature of the power requirements of cordless telephone base stations, the "plug" for the base station is normally a rather large alternating current adapter (transformer), some much larger than the others. The conventional electric power plugs and alternating current adapters may be partially dislodged as a result of inadvertent contact by persons or objects. A partial dislodgement generally exposes the prongs of the electrical plug, which exposure creates an electrical hazard. Additionally, both the electrical power cord and telephone cord are not only unsightly, but excess lengths of the cords can get tangled and can potentially cause a tripping hazard.

Various attempts have been made to minimize excessive lengths of power and telephone cord located between the base station of the cordless telephone and to hide or consolidate the electric power outlet and telephone connection jacks. The first attempts to minimize the excess wire included the use of twist or zip ties and/or mounting a telephone base station as close as possible to the telephone connection jack and electrical power outlet. Other more sophisticated methodologies followed that were modeled after various recessed electrical outlets typically utilized in exterior electrical outlets.

U.S. Pat. No. 4,988,832, by Shotey, titled "Recessed Electrical Outlet with Cover" describes but one example of a recessed exterior electrical outlet. Shotey describes a wall mounted recessed electrical outlet having two recessed female outlets mounted in a housing for receiving and housing two conventional 120 volt male electrical power plugs. The electrical outlet is primarily designed to prevent water or foreign matter contamination. The female outlets are enclosed in the housing which is connected to a nearby building stud through use of a pair of angled nails, one positioned through guides on the upper surface of the housing, and the other positioned through guides on the lower surface of the housing. An extension bracket is positioned at the face of the female outlets and within the housing. A hinged cover is connected to the face of the extension bracket. Two recesses in the bottom of the hinged cover allow passage of the electrical cord for two male electrical power plugs. The outlet housing and female outlets are aligned perpendicular to the adjacent wall surface. Due to the limited space within the wall, the outlet fails to provide sufficient space for an alternating current adapter plug and fails to provide for or contemplate a telephone connection.

U.S. Pat. No. 5,243,134, by Nattel, titled "Combination Power and Communication Electrical Wall Terminal" describes an example of a combination electrical wall terminal (outlet) which incorporates a telephone connection jack. The terminal includes a recessed junction box secured laterally to an adjacent wall stud for installation of the female electrical outlets. The female electrical outlets are attached to an open front end of the junction box. A pair of support flanges are mounted to and at a right angle with a sidewall of the junction box and extend laterally along the wallboard for mounting a wall plate incorporating a telephone connection jack. This device helps keep the electric power cord and telephone cord generally at the same location but, of course, fails to hide the electrical power connector plugs, telephone jack connector, or their associated cords.

Nevertheless, from devices such as those described above, more sophisticated methodologies of consolidating electrical power plugs and telephone communication jacks were developed. For example, U.S. Pat. No. 5,574,256, by Cottone, titled "Recessed Transformer Electrical Outlet Box With Integral Telephone Line Connection" describes an electrical wall outlet box for recessing a 120 volt alternating current transformer or power converter within the electrical outlet box while also providing a standard modular telephone jack connection on the wall or face plate. The outlet box is a single housing with an open front and an open rear and is divided into two sections or wells by an interior divider wall that is parallel to the building drywall. The 120 volt electrical power outlet (receptacle) is mounted to the backside of the interior divider wall and is mostly housed in the back well. The front well snuggly houses a moderately sized alternating current adapter. The outlet box is mounted between two-inch by four-inch wall studs via nail flanges mounted to and at a right angle with a sidewall. The depth of the sides between the open front and the open rear of the outlet box generally measure approximately 3½ inches, the approximate standard distance between interior room drywall panels in conventional housing construction. The wall plate includes both a conventional modular telephone jack to connect the building telephone wire to the base station via the telephone phone cord and an aperture to pass the alternating current adapter cord. The bottom side of the outlet box adjacent the front well includes an aperture for passing building telephone wire to the modular jack, and the bottom side of the outlet box adjacent the rear well includes an aperture for passing building electrical wire to the electrical power outlet. Although the device may serve to recess conventional electric plugs and medium-sized alternating current adapters, because the electrical outlet and the alternating current adapter are serially in-line between the building drywalls, the minimum depth of the outlet is limited. As such, the depth of the forward well may be insufficient for larger alternating current adapters. Additionally, the device fails to contemplate recessing the telephone connection jack, the electrical power cord, or the telephone phone cord. Nor does the device contemplate the mounting of the cordless telephone base station on the outlet box.

Thus, there is still a need for an apparatus for mounting a cordless device or telecommunication device which can accommodate larger alternating current power adapters and associated excess electrical power cord. There is also a need for an apparatus for compactly mounting recessed telephone jacks, telephone jack connectors, and an associated excess telephone phone cord. There is also a need for an electrical outlet box cover or wall plate capable of containing the telephone phone cord and electrical power adapter cord and to pass only the minimum necessary cord in order to "plug-in" the base station to an electrical and/or telephone outlet box. There also is still a need for an outlet cover that can function as a base station wall mounting unit.

SUMMARY OF THE INVENTION

In view of the foregoing, embodiments of the present invention advantageously provide an apparatus and methods which reduce telephone and electrical wiring visualization exposure for a telephone, telecommunication, or electrically powered cordless devices. Embodiments of the present invention advantageously provide an apparatus for mounting a telephone in a building structure to provide reduced wiring visualization and exposure. Embodiments of the present invention can accommodate typical alternating current transformers or adapters in non-conventionally spaced interior walls and much larger alternating current adapters in conventionally spaced interior walls. Embodiments of the present invention can also compactly house and store excess electrical power cord and telephone cord for an electrically powered telecommunication device. Also, embodiments of the present invention can accommodate entry within the apparatus of building electrical or telephone wiring positioned either above or below the apparatus, selectable by the user. Advantageously, embodiments of the present invention can include a self-attaching mounting flange for mounting the base housing to a wall stud or to a furniture structure.

More particularly, an embodiment of the present invention provides an apparatus including a cordless telephone having a base station including a plurality of wall hanging slots adapted to mount the cordless telephone to an interior wall of a building structure, and a structure for mounting the cordless telephone in a building structure to produce reduced wiring visualization and exposure. The structure includes a combination base housing and power outlet housing, the base housing having a base open front, a base backwall, and a plurality of base sidewalls extending between the base open front and the base backwall, whereby each of the plurality of base sidewalls has an exterior surface. The power outlet housing is connected to the exterior surface of one of the plurality of base sidewalls of the base housing to thereby reduce overall depth of a combination of the base housing and the power outlet housing when recessed within the building structure. The reduction in depth provides the ability to size the base housing sufficiently to house an alternating current female electrical power outlet, an alternating current power plug for a telephone, an alternating current power cord connected to the alternating current power plug, a female telephone jack, at least one male telephone jack connector, and a telephone phone cord connected to the male telephone jack connector. The apparatus further includes a base housing cover plate including a plurality of cordless telephone base station mounts adapted to cover the base open front and adapted to connect to the plurality of wall hanging slots of the base station of the cordless telephone to thereby mount the cordless telephone to the recessed combination base housing and power outlet housing, and thus, to the interior wall of the building structure.

An embodiment of the present invention also includes an apparatus for mounting a cordless telephone in a building structure to produce reduced wiring visualization and exposure. The apparatus includes a base housing having a base open front, a base backwall, and a plurality of base sidewalls extending between the base open front and the base backwall, whereby each of the plurality of base sidewalls has an exterior surface. The apparatus also includes a power outlet housing connected to the exterior surface of a first base sidewall of the plurality of base sidewalls of the base housing to thereby reduce overall depth of a combination of the base housing and the power outlet housing within the building structure. The apparatus further includes a wall mounting flange having first and second mounting plates, the first mounting plate of the wall mounting flange connected to the exterior surface of a second base sidewall of the plurality of base sidewalls, and the second mounting plate adapted to be connected to a wall stud of the building structure. The mounting flange provides the ability to recess the base housing and power outlet housing within an interior wall of the building structure.

An embodiment of the present invention also includes an apparatus having a base housing including a base open front, a base backwall, a plurality of base sidewalls extending between the base open front and the base backwall, and a base inner chamber therein positioned between the base backwall and plurality of base sidewalls so that the base open front provides access to the base inner chamber. Advantageously, the base open front is sized large enough to allow the passage into and storage in the inner chamber of a combination of an alternating current power plug, an alternating current power cord, at least one male telephone jack connector, and a telephone cord associated with a telephone. The plurality of base sidewalls of the base housing includes a first base sidewall positioned transverse to and extending between the base open front and the base backwall of the base housing and having at least one power outlet aperture adapted to receive an alternating current female electrical power outlet therein.

Also included is a second base sidewall positioned transverse to and extending between the base open front and the base backwall of the base housing and having a female telephone jack aperture adapted to receive a female telephone jack therein. The apparatus further includes a power outlet housing connected to the first base sidewall of the base housing and having an auxiliary inner chamber therein positioned to interface with the at least one power outlet aperture of the first base sidewall of the base housing to thereby reduce overall depth of a combination of the base housing and the power outlet housing within the building structure. The plurality of base sidewalls of the base housing further includes a third base sidewall positioned opposite the first base sidewall of the base housing and having an outer surface. In order to mount the apparatus to a wall stud in the inner wall of the building structure, a wall mounting flange is connected to the outer surface of the third base sidewall.

So that the major lengthwise extents of the telephone cord and the alternating current power cord are not readily visible outside of the base housing, the apparatus also includes a base housing cover plate positioned to cover the base open front of the base housing to enclose major lengthwise extents of a telephone cord when connected to the male telephone jack connector and alternating current power cord when connected to the alternating current power plug within the base inner chamber of the base housing. The base housing cover plate has at least one cord channel formed in its peripheral region that is adapted to allow passage of at least one of the alternating current power cord and the telephone cord therethrough.

Advantageously, an embodiment of the present invention also includes an apparatus for mounting a cordless device or telecommunication device such as a cordless telephone, a cellular telephone, a cordless toothbrush, a cordless vacuum, an answering machine, and the like, to produce reduced wiring visualization and exposure. The apparatus includes a base housing having a base open front, a base backwall, and a plurality of base sidewalls extending between the base open front and the base backwall, which form a base inner chamber. The base open front provides access to the base inner chamber and is sized large enough to allow the passage into and storage in the inner chamber of an alternating current power plug and an alternating current power cord. At least one of the plurality of base sidewalls is positioned transverse to and extending between the base open front and the base backwall of the base housing and has at least one power outlet aperture adapted to receive an alternating current female electrical power outlet therein. The apparatus also includes a power outlet housing connected to the first base sidewall of the base housing and having an auxiliary inner chamber therein positioned to interface with the at least one power outlet aperture of the first base sidewall of the base housing. This unique positioning is advantageously made to thereby reduce overall depth of a combination of the base housing and the power outlet housing within either a furniture structure or a building structure, depending upon where mounted.

An embodiment of the present invention also includes a method for mounting an outlet housing for a cordless telephone in a building structure to provide reduced wiring visualization exposure. The method includes providing a base housing having a base open front, a base backwall, and a plurality of base sidewalls extending between the base open front and the base backwall forming a base inner chamber therein. The plurality of base sidewalls includes a first base sidewall positioned transverse to and extending between the base open front and the base backwall and having at least one power outlet aperture to receive an alternating current female electrical power outlet therein. The method includes providing a power outlet housing having an power outlet open front, a power outlet backwall, and a plurality of power outlet sidewalls extending between the power outlet open front and the power outlet backwall forming an auxiliary inner chamber therein. The method next includes connecting the power outlet housing to the first base sidewall so that the power outlet open front interfaces with the at least one power outlet aperture of the first base sidewall to thereby reduce overall depth of the outlet housing within the building structure. This feature allows the base housing to be much larger than it would otherwise be capable of if the power outlet housing were connected to the base backwall. The method further includes connecting a wall mounting flange having at least one stud connection spike to an exterior surface of a second sidewall of the plurality of sidewalls of the base housing opposite the first base sidewall of the plurality of base sidewalls.

The method also further includes recessing the base housing and power outlet housing within an interior wall surface of the building structure to thereby house a combination of an alternating current female electrical power outlet, an alternating current power plug for a telephone, an alternating current power cord connected to the alternating current power plug, a female telephone jack, at least one male telephone jack connector, and a telephone cord connected to the male telephone jack connector for connection to a cordless telephone. The method further includes mounting the base housing to a wall stud of the building structure by inserting the at least one stud connection spike into the wall stud of the building structure.

An embodiment of the present invention also includes a method for installing a cordless telephone in a building structure to provide reduced wiring visualization exposure. The method includes a user connecting a male telephone jack connector to a female telephone jack positioned in a base inner chamber of an outlet housing recessed within an interior wall of the building structure and having a base housing and a power outlet housing, by passing the male telephone jack connector through a base open front of the base housing to engage the female telephone jack. The user also connects the alternating current power plug to an alternating current female electrical power outlet positioned within the outlet housing by passing the alternating current power plug through the base open front of the base housing to engage the alternating current female electrical power outlet. The user then positions major lengthwise extents of a telephone cord connected to the male telephone jack connector and alternating current power cord connected to the alternating current power plug within the base inner chamber of the base housing to minimize and reduce wiring visualization exposure. The user then connects a base housing cover plate for the base housing to a plurality of base housing cover plate connection supports positioned within a base inner chamber of the base housing to cover a base open front of the base housing. The base housing cover plate has at least one cord channel formed in a peripheral region of the base housing cover plate adapted to allow passage of the alternating current power cord and the telephone cord, therethrough, in order to provide a cordless telephone with telephone service and electrical power service.

An embodiment of the present invention also includes a method for using a cordless telephone in a building structure to provide reduced wiring visualization exposure. The method includes a user extracting from within a base inner chamber of a base housing recessed within a building interior wall a telephone cord and an alternating current power cord positioned therein. The user passes the cords through a cord channel in a base housing cover plate as necessary to provide sufficient cord to connect a proximal male telephone jack connector connected to the telephone cord and a low voltage power connector connected to the alternating current power cord to a base station of the cordless telephone. The user connects the base station of the cordless phone to the proximal male telephone jack connector of the telephone cord and low voltage power connector of the alternating current power cord. The user then connects a plurality of wall hanging slots of the base station to a plurality of base housing cover plate cordless telephone base station mounts to thereby mount the cordless telephone to the interior wall of the building structure. Finally, where the user extracted excess telephone cord or alternating current power cord, the user passes the excess extracted telephone cord and alternating current power cord through the cord channel in the base housing cover plate back into the base inner chamber as necessary to further reduce wiring visualization exposure of excess extracted telephone and alternating current power cord.

Advantageously, embodiments of the present invention provide reduced wiring visualization exposure of both a telephone cord and electrical power cord of a cordless device such as a cordless telephone. Embodiments of the present invention also include a separate power outlet housing for the electrical power outlet building structure wiring and a separate base housing for the building structure telephone jack wiring. The base housing is sufficiently large enough to accommodate such wiring because the power outlet housing is attached to a base sidewall of the base housing rather than the base backwall. Advantageously, only a minimal amount of electrical and/or telephone cord need protrude from the base housing because the cordless device can mount to a base housing cover plate which encloses the major lengthwise extents of the electrical and/or telephone cords.

BRIEF DESCRIPTION OF THE DRAWINGS

Some of the advantages and features of the present invention having been stated, others will become apparent as the description proceeds when taken in conjunction with the accompanying drawings, in which:

FIG. 1 is a environmental perspective view of a cordless telephone mounted with an apparatus for mounting a telephone in a building structure according to an embodiment of the present invention;

FIG. 2 is a side elevational sectional view of an apparatus for mounting a telephone in a building structure taken along line 2—2 of FIG. 1 according to an embodiment of the present invention;

FIG. 3 is a partially exploded perspective view of an apparatus for mounting a telephone in a building structure according to an embodiment of the present invention;

FIG. 4 is a front elevational view of the apparatus of FIG. 3 attached to a building stud of a building structure according to an embodiment of the present invention.

FIG. 5 is a top plan view of the apparatus of FIG. 3 attached to a building stud according to an embodiment of the present invention.

FIG. 6 is an exploded perspective view of an apparatus for mounting a telephone in a building structure according to an embodiment of the present invention;

FIG. 7 is an exploded perspective view of an apparatus for mounting a telephone in a building structure according to an embodiment of the present invention;

FIG. 8 is an exploded environmental view of an apparatus for mounting a telephone in a building structure according to an embodiment of the present invention;

DETAILED DESCRIPTION

Figure 9:
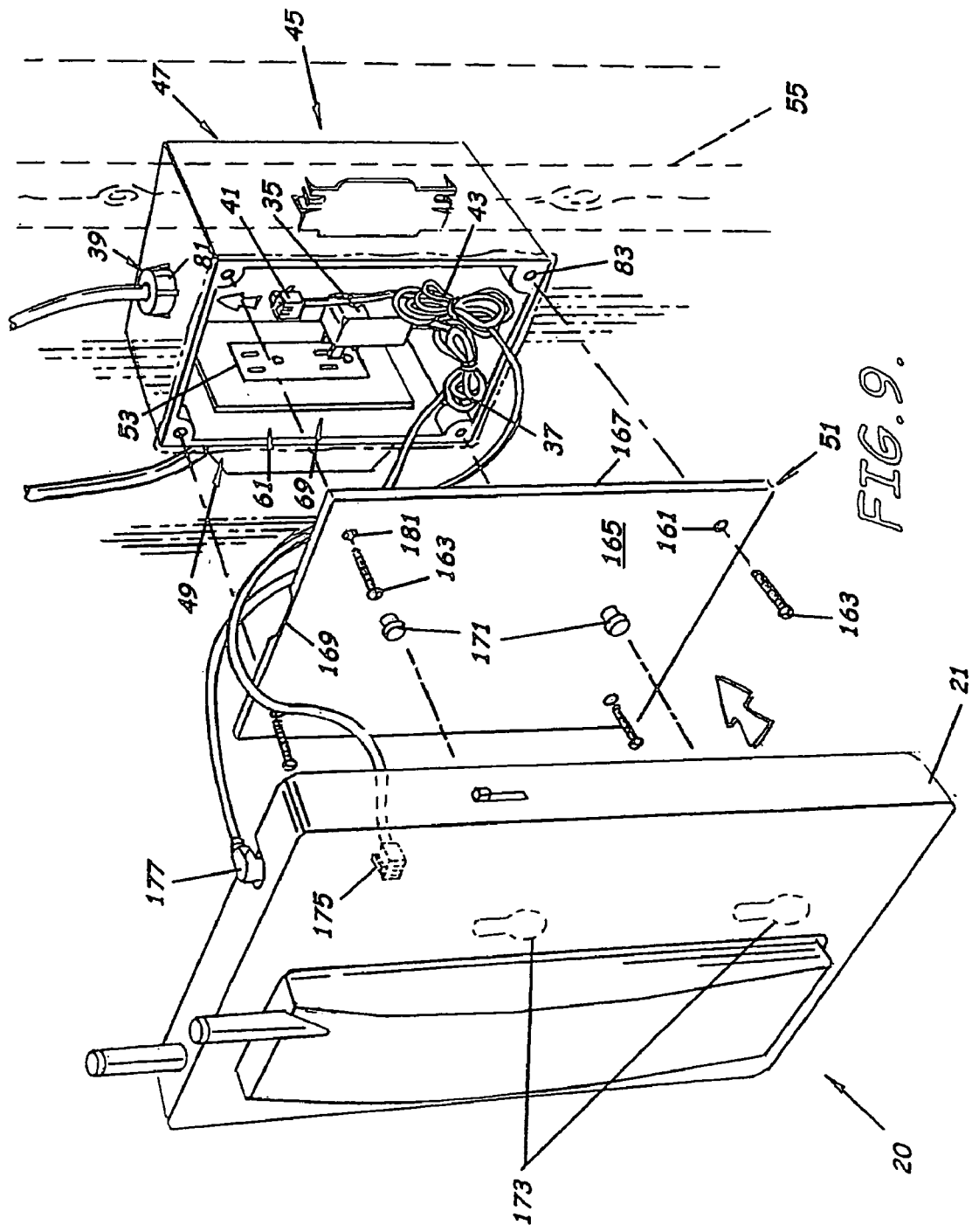
FIG. 9 is a partially exploded perspective view of a cordless telephone mounted with an apparatus for mounting a telephone in a building structure according to an embodiment of the present invention.

The present invention now will be described more fully hereinafter with reference to the accompanying drawings in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout, and prime or double prime, if used indicates similar elements on alternative embodiments.

As illustrated in FIGS. 1–14, embodiments of the present invention advantageously provide an apparatus and methods for mounting a cordless device such as a telephone 20, cellular telephone or similar telecommunications device, cordless toothbrush (not shown) or other cordless device having either a charging base station, or device requiring connection to an alternating current (AC) power plug, in a building or furniture structure to provide reduced wiring visualization and exposure. The following exemplary embodiments describe the apparatus with respect to telephone 20 for illustrative purposes only. The cordless telephone provides the best illustrative example because the cordless telephone is currently one of the most common forms of cordless device which requires both a connection to an AC power plug via an AC power cord and a connection to a telephone jack via a telephone cord. Thus, an apparatus for mounting a cordless telephone must provide not only the ability to reduce wiring visualization and exposure of an AC power cord but also the ability to reduce wiring visualization and exposure for a telephone cord. Additionally, the cordless telephone is currently one of the most commonly wall or furniture mounted cordless devices and thus commands a higher commercial recognition of the need for an apparatus to mount such cordless device.

As perhaps best shown in FIGS. 1 and 2, the apparatus 31 can simultaneously house an AC female electrical power outlet 33, an AC power plug 35 for a cordless telephone 20, an AC power cord 37 connected to the AC power plug 35, a female telephone jack 39, a male telephone jack connector 41, and a telephone phone cord 43 connected to the male telephone jack connector 41. The ability to simultaneously house both the telephone cord 43 and AC power cord 37 and related components is especially important because it provides a significant reduction in wiring visualization and protects the cords 37, 43, and related components from being damaged by environmental hazards. Note, the AC power cord may in fact be conducting direct-current (DC) power to the cordless device depending upon the power requirements of the selected cordless device and configuration of the AC power plug or adapter.

As perhaps best shown in FIG. 3, the apparatus 31 generally includes an electrical power and telephone outlet housing 45 formed by combining a base housing 47 and a power outlet housing 49. As shown in FIG. 2, the combination base housing and power outlet housing 45 is adapted to be recessed within an interior wall of a building structure to house the telephone and AC electric cords 43, 37, and related components of the cordless telephone 20. The apparatus 31 can also include a base housing cover plate 51 (FIG. 9) to enclose a significant portion of the telephone and AC electric cords 43, 37, and related components within the base housing 47, and to provide for mounting and connection of the cordless telephone 20. The apparatus 31 can also include a wall or furniture mounting flange 53 connected to the base housing 47 that is adapted to be connected to a building or furniture structural member such as a wall stud 55.

More specifically, the electrical power and telephone outlet housing 45 includes a base housing 47 having a base open front 61, a base backwall 63, and four base sidewalls 65, 66, 67, 68, (two lateral, a top, and a bottom), which extend between the base open front 61 and the base backwall 63. The walls of the base housing 47 form a base inner chamber 69 positioned between the base backwall 63 and base sidewalls 65, 66, 67, 68, so that the base open front 61 provides access to the base inner chamber 69. The base open front 61 is sized to allow the passage into the base inner chamber 69 of the AC power plug 35 to engage the AC female electrical power outlet 33, the AC power cord 37, the male telephone jack connector 41 to engage the female telephone jack 39, and the telephone cord 20. This allows the outlet housing 45 to be positioned behind a desk, furniture, or other such obstruction where there is limited space, whether or not base housing cover plate 51 is utilized.

As shown in FIG. 6, a first base sidewall 65, positioned transverse to and extending between the base open front 61 and the base backwall 63 of the base housing 47, has a power outlet aperture 71 sized and positioned to receive the AC female electrical power outlet 33. Preferably, the first base sidewall 65 is one of the lateral sidewalls in order to accommodate the standard size and design of typical AC female electrical power outlets 33 which tend to be much longer than they are wide. Note, though the figures only show a single AC female electrical power outlet 33, installation of a second is contemplated within the scope of the present invention.

As perhaps best shown in FIG. 3, a second base sidewall, also positioned transverse to and extending between the base open front 61 and the base backwall 63 of the base housing 47, has a female telephone jack aperture 73 to receive the female telephone jack 39 (FIG. 8). Preferably, the second base sidewall is either the top or bottom base sidewalls 66, 68, in order to provide minimal interference with the AC female power outlet/power plug 33, 35, and a wall mounting flange 53. A third base sidewall, opposite the second base sidewall is correspondingly the other of the top or bottom base sidewalls 66, 68, and can also be configured with a female telephone jack aperture 73 to receive a female telephone jack 39. At least one but preferably both of the top base sidewall and bottom base sidewalls 66, 68, include a pre-scored surface 75 adapted to be detached by a user to form the female telephone jack aperture 73 defining a removable telephone jack knockout. The knockout can provide a user a selectable aperture for connecting the female telephone jack 39 to the base housing 47 to accommodate either top side or bottom side building structure telephone wiring. Though not typical, the knockout can also provide an aperture for connecting lateral or backside building structure telephone wiring. In an alternative embodiment of the present invention, aperture 73 positioned preferably in top sidewall 66 can instead be used to provide heat ventilation for base housing 47 to vent residual heat generated especially when the AC power plug 35 is in the form of a high-power/high-drain transformer-adapter positioned within the base inner chamber 69. The associated knockout 75 can, however, remain connected to top sidewall 66 when the female telephone jack 39 is not used and the AC power plug 35 is not in the form of a high-power/high-drain transformer adapter.

As shown in FIG. 8, the female telephone jack 39 includes the proximal end, a distal end, and a body extending therebetween sized to fit in the female telephone jack aperture 73. The female telephone jack has a cavity 77 for receiving a male telephone jack connector 41. In the configuration shown in FIG. 8, the proximal end of the female telephone jack 39 has a proximal surface extension 79 to provide an inner stop, and the body has a plurality of side connectors 81 to form an outer stop. The combination of the proximal surface extension 79 and plurality of side connectors 81 provide a positive lock of the female telephone jack 39 within the telephone jack aperture 73, when so positioned. Note, other geometric configurations allowing a female telephone jack 39 to be secured within a female telephone jack aperture 73 are within the scope of the present invention.

A fourth base sidewall 67, also positioned transverse to and extending between the base open front 61 and the base backwall 63 of the base housing 47, is used for the attachment of the apparatus 31 to a wall stud 55. The third base sidewall 67 is preferably opposite the first base sidewall 66 to minimize conflict between the building structure telephone and electrical wiring and the wall mounting flange 53, described later. Note, although the figures depict the power outlet housing 49 (described later) attached to base sidewall 65, and depict wall mounting flange 53 (described later) attached to base sidewall 67, the position of the power outlet housing 49 and wall mounting flange 53 can be reversed and still be within the scope of the present invention.

As shown in FIGS. 3 and 9, the base housing 47 also includes means for connecting the base housing cover plate 51 to the base housing 47. For example, a portion of the means can include base housing cover plate supports 83 which can be positioned at least partially within the base inner chamber 69 adjacent the inner perimeter of the base open front 67. The base housing cover plate supports 83 provide a mounting connection for a base housing cover plate 51 (FIG. 9) to connect the base housing cover plate 51 to the base housing 47 adjacent the base open front 61 of the base housing 47. Other supports, fasteners, or connectors as known by those skilled in the art are, however, within the scope of the present invention.

As shown in FIGS. 3 and 4, the electrical power and telephone outlet housing 45 also includes a power outlet housing 49 connected to the first base sidewall 65 of the base housing 47 for receiving and housing at least a portion of the AC female electric outlet 33. The power outlet housing 49 has a power outlet open front 85, a power outlet backwall 86, and four base sidewalls 87, 88, 89, 90, (two lateral, a top, and a bottom) which extend between the power outlet open front 85 and the power outlet backwall 86. The walls of the power outlet housing 49 form an auxiliary inner chamber 93 positioned between the power outlet backwall 86 and the power outlet sidewalls 87, 88, 89, 90. The power outlet open front 85 provides access to the auxiliary inner chamber 93 and is positioned to interface with the power outlet aperture 71 (FIG. 6) of the first base sidewall 65 of the base housing 47. Connecting the power outlet housing 49 to, for example, lateral side 65 or 67, of the base housing 47, rather than the base backwall 63, serves to reduce overall depth of the combination base housing and power outlet housing 45 within the building or furniture structure. This feature allows the base housing 47 base inner chamber 69 to be much larger than would otherwise be possible if the power outlet housing 49 were instead connected to the base backwall 63, and thus allows for enclosing larger AC power plugs 35 and longer AC power cords and telephone cords 37, 43.

There are several methodologies of connecting the power outlet housing 49 to the base housing 47. As perhaps best shown in FIG. 6, in an embodiment of the present invention, the outer surface of the first base sidewall 65 of the base housing 47 is configured with a transversely extending upper rail 95, a lower rail 97 substantially parallel to and spaced apart from the upper rail 95, and a lateral stop 99 preferably positioned adjacent the back ends of the upper and lower rails 95, 97, and adjacent the base backwall 63. Correspondingly, the power outlet housing 49 includes an upper flange 101 and a lower flange 103 substantially parallel to and spaced apart from the upper flange 101 and positioned adjacent the power outlet open front 85 of the power outlet housing 49. In this configuration, the power outlet housing 49 is slidably connected to the outer surface of the first base sidewall 65 along the upper and lower flanges 101, 103, between the upper rail 95, lower rail 97, and lateral stop 99 of the base housing 47 to provide for quick mounting and removal of the power outlet housing 49 from the base housing 47. When the base housing 47 is properly positioned within the interior wall, the drywall 56 (FIG. 9) acts as a forward stop to hold the power outlet housing 49 in a proper position on the rails 95, 97. Forward stop 100 can also serve such purpose if so configured. Alternative configurations are, however, within the scope of the present invention. For example, instead of using rails 95, 97, fasteners or other connection means as shown by those skilled in the art can instead be used to connect the power outlet housing 49 to the base first sidewall 65 of the base housing 47. Also, the power outlet housing 49 and base housing 47 can be more permanently connected through means such as welding, or other such methods also known by those skilled in the art.

As perhaps best shown in FIG. 3, at least one, but preferably two, power outlet sidewalls such as top and bottom power outlet sidewalls 88, 90, and/or the power outlet backwall 86 includes a pre-scored surface adapted to be detached by a user to form the building structure AC electrical wiring apertures 105 defining a removable electrical wiring knockout 109. The knockout 109 provides the user a selectable passageway to more easily accommodate top side and bottom side building AC electrical wiring (FIG. 8) to connect to and supply electrical power to the AC female electrical power outlet 33. The power outlet housing 49 further includes a pair of external spaced apart protuberances 113 positioned adjacent the building structure AC electrical wiring aperture 105 to provide guidance for passage of the building structure AC electrical wiring through the AC electrical wiring aperture 105 and into the auxiliary inner chamber 93 of the power outlet housing 49 to connect to and supply electrical power to the AC female electrical power outlet 33.

As shown in FIGS. 8 and 9, the AC female electric outlet 33 is positioned at the power outlet open front 89 so that its front side faces the base inner chamber 69 of the base housing 47 and its backside faces the auxiliary inner chamber 93 of the power outlet housing 47. The AC female electric outlet 33 has an upper and a lower flange 117, 119, used to secure the AC female electric outlet 33 to the inner surface of the first base sidewall 65 above and below the power outlet aperture 71, respectively. As noted above, at least one of the power outlet sidewalls 87, 88, 89, 90, and/or the power outlet backwall 86 includes the building structure AC electrical wiring aperture 105 which is adapted to allow passage of building structure AC electrical wiring into the auxiliary inner chamber 93 of the power outlet housing 49 to connect to and supply electrical power to the AC female electrical power outlet 33 when so positioned inside the power outlet housing 49. The AC electrical wiring and building structure telephone wiring enter separate chambers of the combination power and telephone outlet housing 45 due to electrical wiring code requirements.

A power outlet cover plate 121 can be positioned in the base inner chamber 69 of the base housing 47 to overlie portions of the power outlet open front 85 of the power outlet housing 49 and inner surface portions of the first base sidewall 65 and the power outlet aperture 71 to cover the outer periphery of the AC female electrical power outlet 33 and further enclose the auxiliary inner chamber 93 of the power outlet housing 49 between the base housing 47 and the power outlet housing 49. The power outlet cover plate 121 has at least one power outlet cover aperture 123 extending therethrough and sized to surround the at least one AC electrical socket 125 of the AC female electrical power outlet 33 to provide access to the AC female electrical power outlet 33 when positioned in the auxiliary inner chamber 93 of the power outlet housing 49. The power outlet cover plate 121 also includes a plurality of power outlet connection apertures 127 positioned to align with at least two flange apertures 131 extending from the AC female electrical power outlet 33 and at least two apertures or bores 135 in the first base sidewall 65 of the base housing 47 to connect the power outlet cover plate 121 and AC female electrical power outlet 33 to the first base sidewall 65 of the base housing 47. Although other configurations are within the scope of the present invention, the above described configuration is preferred as it allows for use of commercially available female electrical power outlets 33 and power outlet cover plates 121.

As shown in FIGS. 5 and 7, a wall mounting flange 53 can be connected to the outer surface of the fourth base sidewall, such as base sidewall 67, to provide connection of the combination base housing and power outlet housing 45 to a wall stud 55 of the building structure. In an embodiment of the present invention, the fourth base sidewall of the base housing 47 (base sidewall 67) is positioned opposite the first base sidewall 65 and has an exterior surface which includes a transversely extending upper rail 141 and a lower rail 143 substantially parallel to and spaced apart from the upper rail 141. The upper and lower rails 141, 143, provide a slidable mounting structure. The fourth base sidewall 67 also has a lateral or aft stop 145 adjacent the back ends of the upper and lower rails 141, 143. In this embodiment, the wall mounting flange 53 has first and second mounting plates 147, 149, which substantially form an L-shape. The first mounting plate 147 of the wall mounting flange 53 is slidably connected to and substantially parallel with the exterior surface of the fourth base sidewall 67 along the upper rail 141 and the lower rail 143 to provide for quick mounting of the wall mounting flange 53 to and removal from the base housing 47. The lateral stop 145 provides an aft stop to the first mounting plate 147 for proper positioning of the wall mounting flange 53. In this embodiment, when the base housing cover plate 51 is installed, the base housing 47 is slid forward on the upper and lower rails 141, 143, until the lateral stop 145 contacts the back end of the first mounting plate 147. Thus, the base housing cover plate 51 in conjunction with the drywall 56 can provide a forward stop to "lock" the base housing 47 in the proper position on the rails 141, 143, within the building structure. Lateral stop 146 can also serve such purpose, if the fourth base sidewall is so configured. Note, other alternative configurations are within the scope of the present invention. For example, instead of using rails 141, 143, fasteners can instead be used to connect the wall mounting flange 53 to the fourth base sidewall 67 of the base housing 47. Also, the wall mounting flange 53 and base housing 47 can be more permanently connected through means such as welding, or other methods also known by those skilled in the art.

The second mounting plate 149 of the wall mounting flange 53 can include mounting spikes 151 which can be adapted to pierce the wall stud 55 and can be positioned substantially parallel to the fourth sidewall 67 to connect the combination base housing and power outlet housing 45 to the wall stud 55 of the building structure. Additionally, the second mounting plate 149 can have either apertures or slots 155 for allowing attachment of the plate 149 to the wall stud 55 using additional fasteners or stud connectors (not shown), such as nails, screws, or an adhesive. In either case, this configuration is primarily implemented in new construction where the drywall 56 has not yet been installed or in existing construction where the drywall 56 has been removed from the wall stud 55 adjacent to the position the apparatus is to be mounted.

Figure 10:
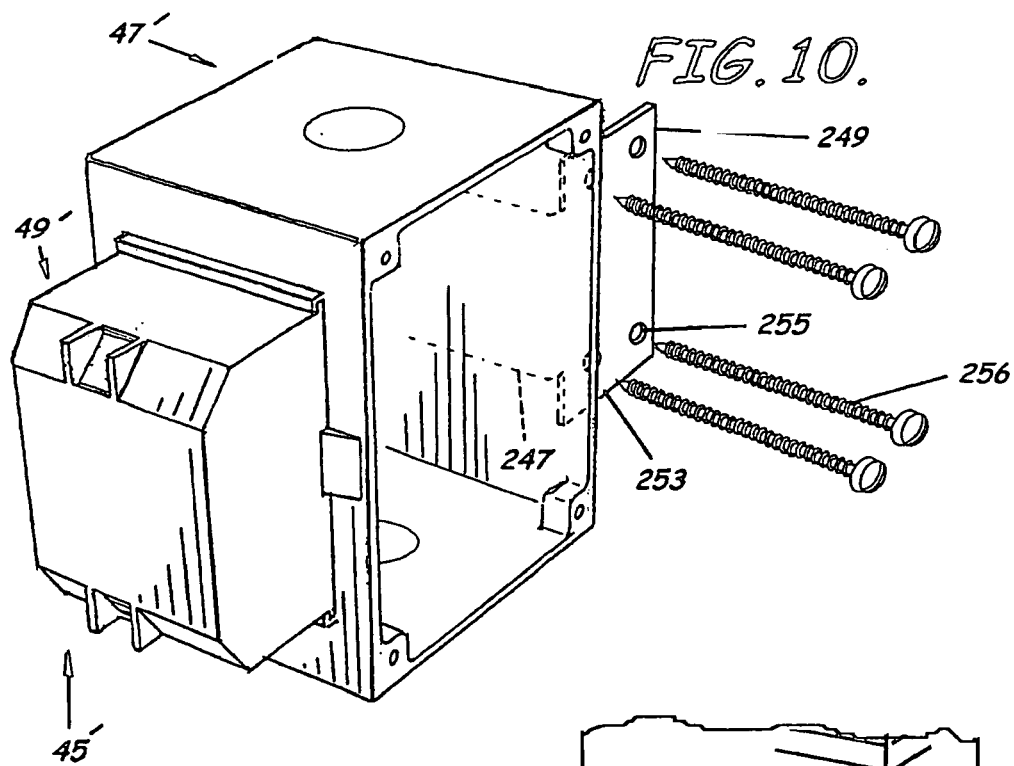
FIG. 10 is a partially exploded perspective view of an apparatus for mounting a telephone in a building structure according to another embodiment of the present invention.

As shown in FIG. 10, in another embodiment of the present invention, a mounting flange 253 is connected to an electrical power and telephone outlet housing 45' formed by connecting base housing 47' with power outlet housing 49'. The mounting flange 253 includes a first and second mounting plates 247, 249. The second mounting plate 249 is substantially flat and contains a plurality of slots or apertures 255 which are adapted to receive fasteners or stud connectors such as, for example, nails or screws 256 to affix the second mounting plate 249, and thus the combination base housing and power outlet housing 45', to a wall stud. This configuration can be used in both new construction and existing construction. When used with existing construction where the drywall has not been removed, the second mounting plate 249 can be slid between the back side of the existing drywall and the front side of the wall stud can be attached to the wall stud by inserting fasteners or stud connectors through the drywall and through the slots or apertures 255 of the second mounting plate 249. A template (not shown) can be used to identify the proper location to insert the fasteners or stud connectors.

Figure 11:
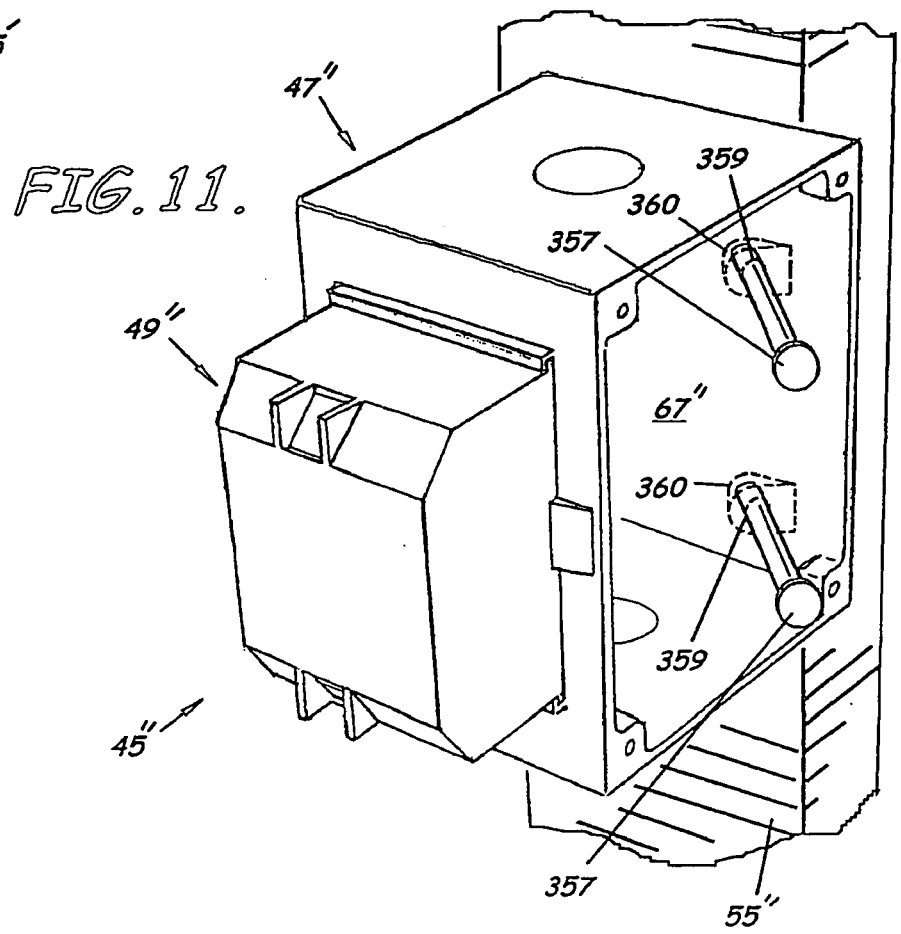
FIG. 11 is a perspective view of an apparatus for mounting a telephone in a building structure according to yet another embodiment of the present invention.
Figure 12:
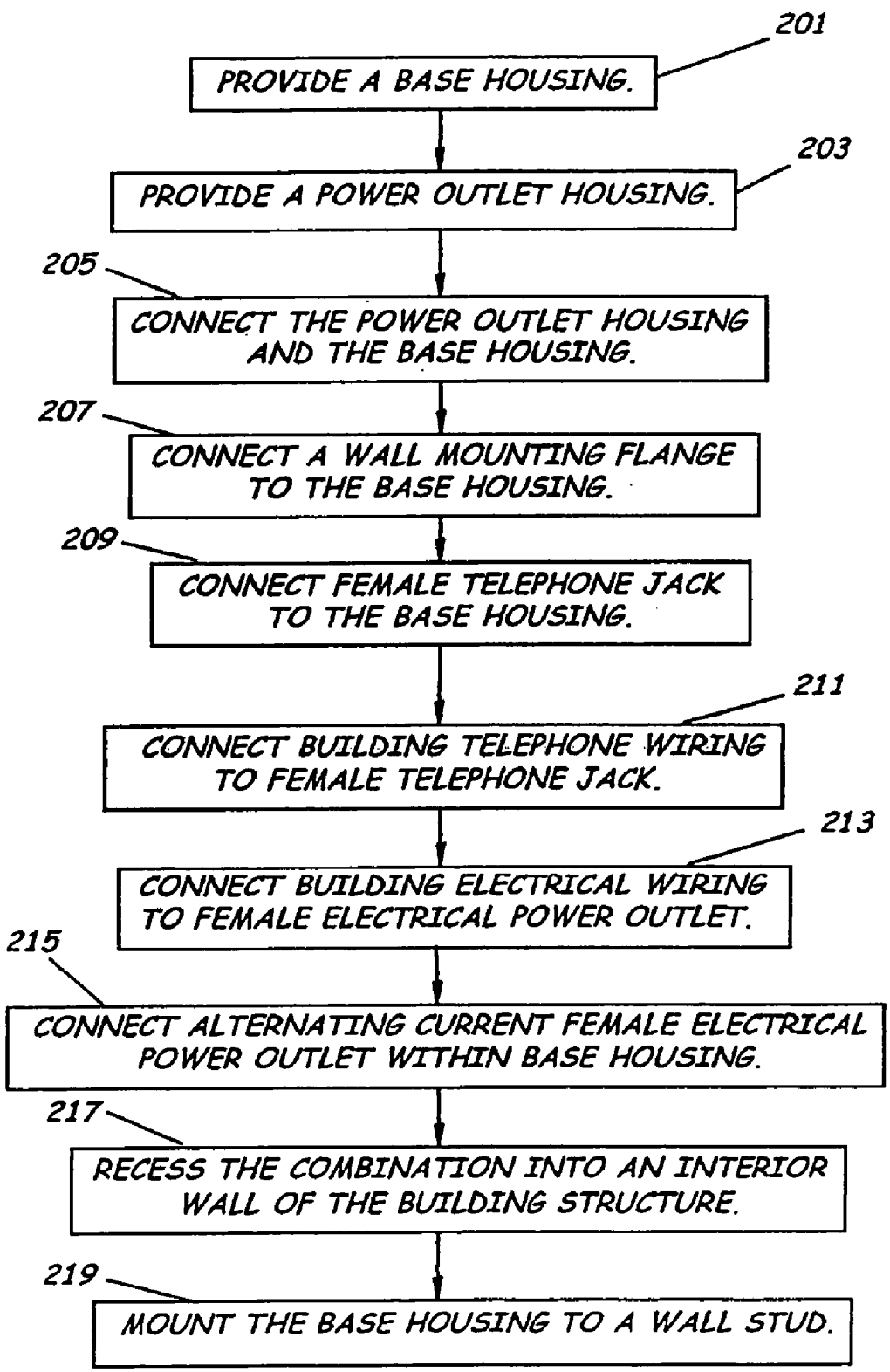
FIG. 12 is a flowchart of a method to mount an outlet housing for a telephone in a building structure according to an embodiment of the present invention.

As perhaps best shown in FIG. 11, in another embodiment of the present invention, instead of using a separate wall mounting flange, the fourth base sidewall 67" of the base housing 47" of the combination electrical power and telephone outlet housing 45" can be attached directly to a wall stud 55" through use of fasteners or stud connectors such as, for example, nails or screws 357, adhesive, or other similar means as known by those skilled in the art. The fourth base sidewall 67" can have a plurality of wall stud connection apertures 359 to allow such connection of the fourth base sidewall 67" directly to the wall stud 55". Additionally, the fasteners can be of a type known by those skilled in the art which can be hammered, screwed, or otherwise caused to penetrate through the fourth base sidewall 67" to form the apertures 359. If nail or screw-type fasteners are used and are to be angled into the wall stud 55" rather than be introduced perpendicular to the base sidewall 67", angled spacers 360 can be used to provide added stability and to provide a structurally sound connection to stud 55".

As illustratively shown in FIG. 9, in either of the configurations described above, the apparatus 31 can also include a base housing cover plate 51 positioned to cover the base open front 61 of the base housing 47 and to enclose, within the base inner chamber 69, major lengthwise extents of the telephone cord 43 connected to the male telephone jack connector 41 and AC power cord 37 connected to the AC power plug 35 within the base inner chamber 69 of the base housing 47. With the base housing cover plate 51 installed, the major lengthwise extents of the telephone cord 43 and the AC power cord 37 are not readily visible outside of the base housing 47 (FIG. 2).

The base housing cover plate 51 can include means for connecting the base housing cover plate 51 to the base housing 47. For example, at least a portion of the means can include a plurality of the base cover plate connection apertures 161 positioned to provide for the passage of a corresponding plurality of base housing cover plate connectors 163. The base housing cover plate connection apertures 161 align with the plurality of base housing cover plate supports 83 when the base housing cover plate 51 is positioned to cover the base open front 61 of the base housing 47 to thereby connect the base housing cover plate 51 to the base housing cover plate supports 83. Other connectors or fasteners, as known by those skilled in the art, are, however, within the scope of the present invention. Particularly, an alternative configuration includes connectors, fasteners, or the like, which can provide for a quick disconnect of the base housing cover plate 51 from the base housing 47 without tools but which are sufficiently strong enough to mount a cordless device.

The base housing cover plate 51 has a front cover plate surface 165 and an outer perimeter 167 surrounding the front cover plate surface 165. At least a portion of the outer perimeter 167 can be deflected away from the front cover plate surface 165 to further provide reduced wiring visualization and exposure when the base housing cover plate 51 is positioned to cover the base open front 61 of the base housing 47. The base housing cover plate 51 also has at least one cord channel 169 formed in a peripheral region of the base housing cover plate 51 which is adapted to allow passage of at least the AC power cord 37 and preferably the telephone cord 43 therethrough for connection of a telephone base such as the cordless phone base station 21 to the AC female electrical power outlet 33 and to the female telephone jack 39. The cord channel aperture 169 can alternatively be located at a central position on the base housing cover plate 51 or at an intermediate position therebetween. The base housing cover plate 51 can be larger than the base open front 61 of the base housing 47 in order to provide for a positive contact with the drywall 56 of the building structure or a furniture structure and thus, can form part of the wall or furniture mounting structure for the apparatus 31. The base housing cover plate 51 can also include means for connecting a cordless or telecommunication device such as telephone 20 to the base open front 61 of the base housing 47. For example, as shown in FIG. 9, telephone base mounts 171 can be adapted to connect to standard wall hanging slots 173 of a telephone base with respect to base station 21 of the cordless telephone 20. The mounts 171 in conjunction with slots 173 allow mounting of a cordless or telecommunication device such as the cordless telephone 20 to the interior wall of the building structure, as shown in FIG. 1. Mount or mounts 171 can be universal and repositionable upon the face of base housing cover plate 51 in order to accommodate a wide array of cordless device base station designs and can be of various configurations as known understood by those skilled in the art.

Advantageously, embodiments of the present invention include a method of mounting (FIG. 12), a method of installing (FIG. 13), and a method of using (FIG. 14) an outlet housing for a cordless or telecommunication device such as a telephone in a furniture or building structure to provide reduced wiring visualization exposure. As also shown in FIG. 6, the method of mounting the outlet housing includes a user (block 201) providing a base housing 47 having a base open front 61, a base backwall 63, and a plurality of base sidewalls 65, 66, 67, 68, extending between the base open front 61 and the base backwall 63 forming a base inner chamber 69 therein. The plurality of base sidewalls 65, 66, 67, 68, includes a first base sidewall 65 positioned transverse to and extending between the base open front 61 and the base backwall 63 and having at least one power outlet aperture 71 to receive an AC female electrical power outlet 33 therein. The user (block 203) provides a power outlet housing 49 having a power outlet open front 85, a power outlet backwall 86, and a plurality of power outlet sidewalls 87, 88, 89, 90, extending between the power outlet open front 89 and the power outlet backwall 86, forming an auxiliary inner chamber 93 therein. The user (block 205) connects the power outlet housing 49 to the first base sidewall 65 so that the power outlet open front 85 interfaces with the at least one power outlet aperture 71 of the first base sidewall 65 to thereby reduce overall depth of the combined base housing and power outlet housing 45 within the building structure.

As shown in FIG. 7, the user also (block 207) connects a wall mounting flange 53 preferably having at least one stud connection spike 151 to an exterior surface of a second sidewall 67 of the plurality of sidewalls 65, 66, 67, 68, of the base housing 47 which is preferably located opposite the first base sidewall 65 of the base housing 47. As shown in FIG. 8, the user (block 209) connects a female telephone jack 39 to preferably either a top or a bottom base sidewall 66, 68, of the base housing 47 having a female telephone jack aperture 73 sized to receive the telephone jack 39, and (block 211) connects the building telephone wiring to the female telephone jack 39 to provide telephone service capability to the female telephone jack 39. The user next (block 213) connects building electrical wiring to the AC female electrical power outlet 33 to provide AC electrical power service, and (block 215) connects an AC female electrical power outlet 33 at least partially within the base inner chamber 69 of the base housing 47.

As shown in FIG. 9, the user next (block 217) recesses the combined base housing and power outlet housing 45 within an interior wall surface of the building structure, and (block 219) mounts the base housing 47 to a wall stud 55 of the building structure by inserting the stud connection spikes 151, if so configured, into the wall stud 55 of the building structure, to thereby house a combination of the AC female electrical power outlet 33, the AC power plug 35 for the telephone 20, the AC power cord 37 connected to the AC power plug 35, the female telephone jack 39, at least one male telephone jack connector 41, and a telephone cord 43 connected to the male telephone jack connector 41 for connection to a cordless telephone 20.

Figure 13:
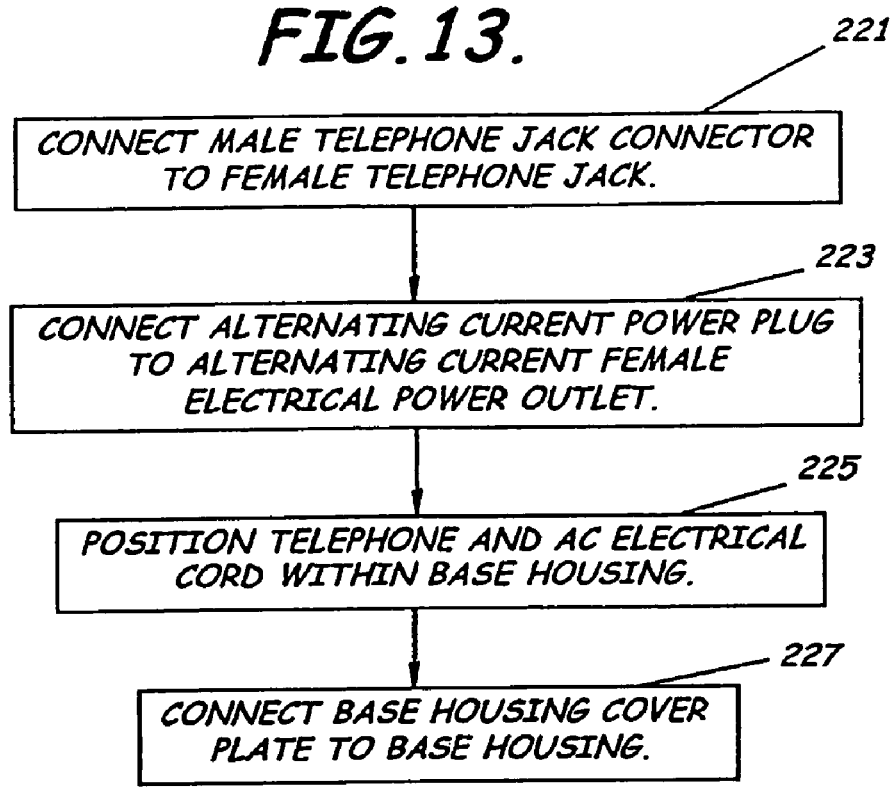
FIG. 13 is a flowchart of a method to install an outlet housing for a telephone in a building structure according to an embodiment of the present invention.

As shown in FIG. 13, an embodiment of the present invention includes a method for installing a telephone in a building structure to provide reduced wiring visualization exposure. As shown in FIG. 9, the method includes a user (block 221) connecting a male telephone jack connector 41 to a female telephone jack 39 positioned in a base inner chamber 69 of a base housing 47 and power outlet housing 49 combined and recessed within an interior wall of the building structure. The connection can be accomplished by passing the male telephone jack connector 41 through a base open front 61 of the base housing 47 to engage the female telephone jack 39. The method also includes (block 223) connecting the AC power plug 35 to an AC female electrical power outlet 33 positioned within the base housing and power outlet housing 45 by passing the AC power plug 35 through the base open front 61 of the base housing 47 to engage the AC female electrical power outlet 33. The user (block 225) then positions major lengthwise extents of a telephone cord 43 connected to the male telephone jack connector 41 and AC power cord 37 connected to the AC power plug 35 within the base inner chamber 69 of the base housing 47. The user then (block 227) connects a base housing cover plate 51 for the base housing 47 to a plurality of base housing cover plate connection supports 83 positioned within a base inner chamber 69 of the base housing 47 to cover a base open front 61 of the base housing 47, the base housing cover plate 51 having at least one cord channel 169 formed preferably in a peripheral region 167 of the base housing cover plate 51 adapted to allow passage of the AC power cord 37 and the telephone cord 43, therethrough.

Figure 14:
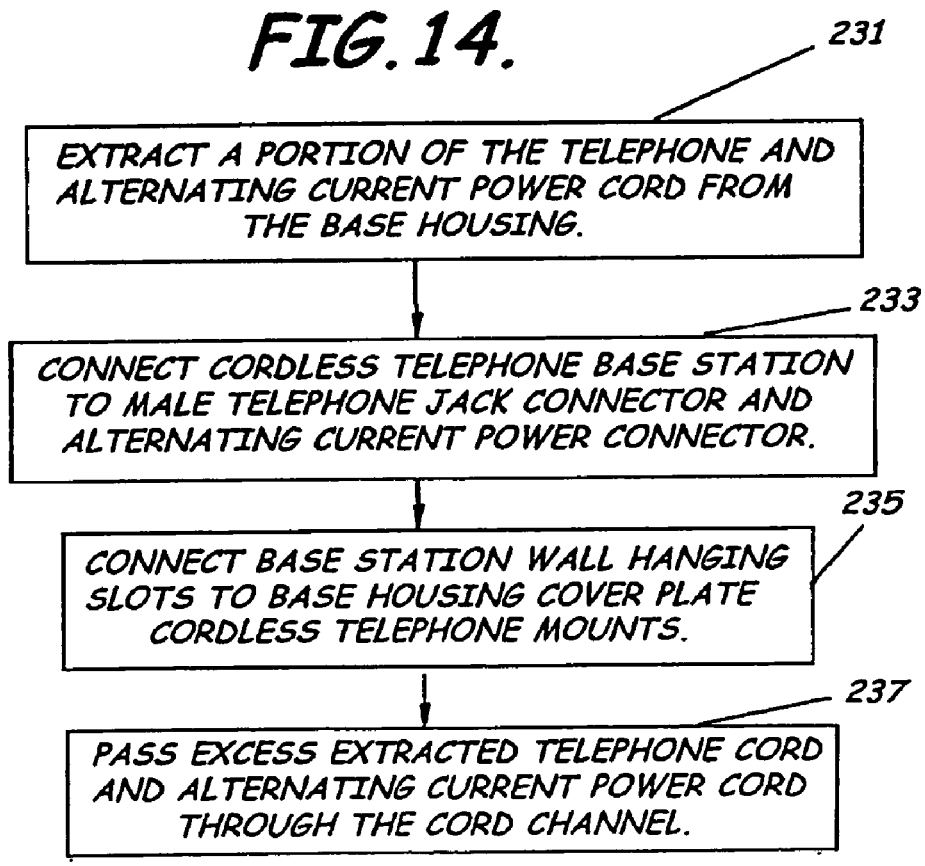
FIG. 14 is a flowchart of a method to use an outlet housing for a telephone in a building structure according to an embodiment of the present invention.

As shown in FIG. 14, an embodiment of the present invention includes a method for using a cordless telephone in a building structure to provide reduced wiring visualization exposure. As shown in FIGS. 2 and 9, the method includes a user (block 231) extracting from within a base inner chamber 69 of a base housing 47 recessed within a building interior wall a telephone cord 43 and an AC power cord 37 positioned therein, and passing the cords 37, 43, through a cord channel 169 in a base housing cover plate 51 as necessary to provide sufficient cord to connect a proximal male telephone jack connector 175 connected to the telephone cord 43 and a low voltage power connector 177 connected to the AC power cord 37 to a telephone base such as base station 21 of the cordless telephone 20. The distal male telephone jack connector 41 of the telephone cord 43 and AC power plug 35 of the AC power cord 43 should be previously connected within the base inner chamber 69 of the base housing 47. If not, the user can accomplish this task. The user then (block 233) connects the base station 21 of the cordless phone 20 to the proximal male telephone jack connector 175 of the telephone cord 43 and low voltage power connector 177 of the AC power cord 37, and (block 235) connects a plurality of wall hanging slots 173 of the base station 21 to a corresponding plurality of base housing cover plate telephone base mounts, such as cordless telephone base station mounts 171, to thereby mount the telephone to the interior wall of the building structure (FIG. 1). Finally, the user (block 237) passes excess extracted telephone cord 43 and AC power cord 37 back through the cord channel 169 in the base housing cover plate 51 and back into the base inner chamber 69 as necessary to further reduce wiring visualization exposure of excess extracted telephone cord 43 and AC power cord 37.

In the drawings and specification, there have been disclosed typical preferred embodiments of the invention and, although specific terms are employed, they are used in a generic and descriptive sense only and not for the purpose of limitation. The invention has been described in considerable detail with specific reference to these illustrated embodiments. It will be apparent, however, that various modifications and changes can be made within the spirit and scope of the invention as described in the foregoing specification and as defined in the attached claims. For example, the cordless device, though illustrated as a cordless telephone, can instead be a cellular telephone, a cordless toothbrush, a cordless drill, a cordless vacuum, and a vast array of other personal electronic devices which can be positioned close to an electric outlet and which have power cords or telecommunication cords which have significant lengthwise extents that are amiable to being stowed. The base housing cover plate supports can be within the structure of the base sidewalls of the base housing or positioned on the external services of the base sidewalls. The illustrated pair of base housing cover plate mounts can instead be a single mount or a plurality of mounts, and the base housing cover plate need not be rectangular shaped. Also, for example, regarding the method of mounting an outlet housing, the power outlet housing was described as connected to the base housing in a step that occurred prior to connecting the wall mounting flange however, as with most of the steps, the order of connecting the power outlet housing and wall mounting flange to the base housing is not necessarily important. Additionally, although the mounting of the combination electrical power and telephone outlet housing was primarily described and illustrated with respect to a building structure, it is within the scope of the present invention to mount the combination base housing and power outlet housing within or affixed to a piece of furniture or even a building fixture.

That claimed is:

1. A combination electrical power and telephone outlet housing comprising: a base housing having a backwall and a sidewall defining an inner chamber and having an open front, the inner chamber adapted to house an electrical power cord, a power plug, and a telephone cord, the open front dimensioned to permit the passage therethrough of an electrical power cord, a telephone cord, and a male telephone jack, the sidewall having an aperture therethrough for receiving a power outlet and a female telephone jack; a power outlet housing affixable to the base housing and comprising a backwall, an open front and a sidewall defining an auxiliary inner chamber, the open front positionable in communication with the base housing aperture, the sidewall having a wiring aperture therethrough dimensioned for passing electrical wiring from exterior of the power outlet housing through to the auxiliary inner chamber, the auxiliary inner chamber dimensioned for housing the power outlet; and means for affixing a power outlet within the combination housing, the power outlet comprising a front side having a socket and an outlet body protruding rearward of the front side, wherein the power outlet front side is affixable to face the inner chamber so as to be substantially flush with the base housing sidewall, the outlet body contained within the auxiliary inner chamber and connectable to electrical wiring passed through the wiring aperture.

2. The outlet housing of claim 1, further comprising a wall mounting flange connected to an outer surface of the base sidewall for providing connection to a wall stud of the building structure.

3. The outlet housing of claim 1, wherein the base sidewall has an outer surface including a transversely extending upper rail, a lower rail substantially parallel to and spaced apart from the upper rail, the upper rail and lower rail having adjacent first and second ends, and a lateral stop adjacent one of the first and second ends of the upper and lower rails, wherein the power outlet housing includes an upper flange and a lower flange substantially parallel to and spaced apart from the upper flange and positioned adjacent the open front of the power outlet housing, and wherein the power outlet housing is slidably connected to the outer surface of the first base sidewall along the upper and lower flanges between the upper rail, lower rail, and lateral stop of the base housing to provide for quick mounting and removal of the power outlet housing from the base housing.

4. The outlet housing of claim 1, wherein the base sidewall further includes an exterior surface including a transversely extending upper rail, a lower rail substantially parallel to and spaced apart from the upper rail, the upper rail and lower rail having adjacent first and second ends, and a lateral stop adjacent an end of the upper and lower rails, wherein the outlet housing further comprises a wall mounting flange having first and second mounting plates substantially forming an L-shape, and wherein the first mounting plate of the wall mounting flange is slidably connected to the exterior surface of the base sidewall along the upper rail, the lower rail, and the lateral stop and substantially parallel with the exterior surface of the base sidewall, to provide for quick mounting of the wall mounting flange to and removal from the base housing.

5. The outlet housing of claim 4, wherein the second mounting plate of the wall mounting flange includes at least one spike adapted to pierce a wall stud and positioned substantially parallel to the sidewall for connecting to a wall stud of a building structure.

6. The outlet housing of claim 1, further comprising a power outlet cover plate positioned in the base inner chamber and positioned to overlie portions of the power outlet housing open front and inner surface portions of the base sidewall and having a power outlet cover aperture extending therethrough to provide access to the power outlet socket when positioned within the housing.

7. The outlet housing of claim 1, further comprising a base housing cover plate positioned to cover the base open front and having at least one cord channel formed in a peripheral region of the base housing cover plate adapted to allow passage of at least one of an alternating current power cord and a telephone cord therethrough. and further having a cordless telephone base station mount adapted to connect to a wall hanging slot of a base station of a cordless telephone to thereby mount the cordless telephone to an interior wall of the building structure, and wherein the base open front includes an inner perimeter, and wherein the base housing includes a plurality of base housing cover plate supports positioned at least partially within the base inner chamber adjacent the inner perimeter of the base open front to provide a mounting connection for the base housing cover plate to the base housing adjacent the base open front in covering relation to the base open front and to enclose the base inner chamber.

8. The outlet housing of claim 1, wherein the base sidewall further has a female telephone jack aperture sized to receive a female telephone jack.

9. The outlet housing of claim 8, wherein the base sidewall includes a pre-scored surface adapted to be detached by a user to form the female telephone jack aperture defining a removable telephone jack knockout to thereby provide a user selectable aperture for connecting the female telephone jack to the base housing to accommodate at least one of top side and bottom side building structure telephone wiring.

10. The outlet housing of claim 1, wherein the base backwall has at least one power outlet aperture to receive an alternating current female electrical power outlet therein, and the power outlet backwall has a building structure alternating current electrical wiring aperture adapted to allow passage of building structure alternating current electrical wiring to connect to and supply electrical power to the alternating current female electrical power outlet when positioned therein, and further wherein at least one of the power outlet sidewall and the power outlet backwall includes a pre-scored surface adapted to be detached by a user to form the building structure alternating current electrical wiring aperture defining a removable electrical wiring knockout to thereby provide a user selectable passageway to accommodate at feast one of top side and bottom side building alternating current electrical wiring to connect to and supply electrical power to an alternating current female electrical power outlet, and wherein the power outlet housing further includes a pair of external spaced apart protuberances positioned adjacent the building structure alternating current electrical wiring aperture to provide guidance for passage of the building structure alternating current electrical wiring through the alternating current electrical wiring aperture into the auxiliary inner chamber of the power outlet housing to connect to and supply electrical power to the alternating current female electrical power outlet.

11. The outlet housing of claim 7, further comprising a plurality of base cover plate connectors, wherein the base housing cover plate includes a plurality of base housing cover plate connection apertures positioned to provide for the passage of the plurality of base housing cover plate connectors and positioned to align with the plurality of base housing cover plate supports when the base housing cover plate is positioned to cover the base open front to thereby connect the base housing cover plate to the plurality of base housing cover plate supports, wherein the base housing cover plate has a front cover plate surface and an outer perimeter surrounding the front cover plate surface, and wherein at least a portion of the outer perimeter is deflected away from the front cover plate surface to further provide reduced wiring visualization and exposure when the base housing cover plate is positioned to cover the base open front.

12. The outlet housing of claim 6, wherein the base sidewall further includes a plurality of bores to provide a mounting connection for the power outlet cover plate to mount the power outlet cover plate to the base sidewall and to enclose the auxiliary inner chamber of the power outlet housing between the base housing and the power outlet housing.

13. An apparatus comprising: a base housing having a base open front, abase backwall, a plurality of base sidewalls extending between the base open front and the base backwall, and a base inner chamber therein positioned between the base backwall and plurality of base sidewalls so that the base open front provides access to the base inner chamber, the base open front being sized large enough to allow the passage into and storage in the inner chamber of a combination of an alternating current power plug, an alternating current power cord, at least one male telephone jack connector, and a telephone cord associated with a telephone, the plurality of base sidewalls comprising: a first base sidewall positioned transverse to and extending between the base open front and the base backwall of the base housing and having at least one power outlet aperture adapted to receive an alternating current female electrical power outlet therein, and a second base sidewall positioned transverse to and extending between the base open front and the base backwall of the base housing and having a female telephone jack aperture adapted to receive a female telephone jack therein; a power outlet housing connected to the first base sidewall of the base housing and having an auxiliary inner chamber therein positioned to interface with the at least one power outlet aperture of the first base sidewall of the base housing to thereby reduce overall depth of a combination of the base housing and the power outlet housing within a building structure, the power outlet housing having a wiring aperture therethrough dimensioned for passing electrical wiring from exterior of the power outlet housing through to the auxiliary inner chamber; and means for affixing a power outlet within the apparatus, the power outlet comprising a front side having a socket and an outlet body protruding rearward of the front side, wherein the power outlet front side is affixable to face the inner chamber so as to be substantially flush with one of the base housing sidewalls, the outlet body contained within the auxiliary inner chamber and connectable to electrical wiring passed through the wiring aperture.

14. An apparatus of claim 13, further comprising a base housing cover plate positioned to cover the base open front of the base housing to enclose major lengthwise extents of the telephone cord when connected to the male telephone jack connector and the alternating current power cord when connected to the alternating current power plug within the base inner chamber of the base housing so that the major lengthwise extents of the telephone cord and the alternating current power cord are not readily visible outside of the base housing.

15. An apparatus of claim 14, wherein the base housing cover plate has at least one cord channel formed in a peripheral region of the base housing cover plate adapted to allow passage of at least one of the alternating current power cord and the telephone cord therethrough.

16. An apparatus of claim 14, wherein the base housing cover plate has a plurality of cordless telephone base station mounts adapted to connect to a plurality of wall hanging slots of a base station of the cordless telephone to thereby mount the cordless telephone to an interior wall of the building structure.

17. An apparatus of claim 13, wherein the first base sidewall has an outer surface including a transversely extending upper rail, a lower rail substantially parallel to and spaced apart from the upper rail, the upper rail and lower rail having adjacent first and second ends, and a lateral stop adjacent one of the first and second ends of the upper and lower rails, wherein the power outlet housing includes an upper flange and a lower flange substantially parallel to and spaced apart from the upper flange and positioned adjacent the power outlet open front of the power outlet housing, and wherein the power outlet housing is slidably connected to the outer surface of the first base sidewall along the upper and lower flanges between the upper rail, lower rail, and lateral stop of the base housing to provide for quick mounting and removal of the power outlet housing from the base housing.

18. An apparatus of claim 13, wherein the plurality of base sidewalls of the base housing further includes a third base sidewall having an outer surface positioned opposite the first base sidewall of the base housing, and wherein the apparatus further comprises a wall mounting flange connected to the outer surface of the third base sidewall to thereby provide connection of the base housing to a wall stud of the building structure.

19. An apparatus of claim 13, wherein the plurality of base sidewalls further includes a third base sidewall having an exterior surface including a transversely extending upper rail, a lower rail substantially parallel to and spaced apart from the upper rail, the upper rail and lower rail having adjacent first and second ends, and a lateral stop adjacent an end of the upper and lower rails, wherein the apparatus further comprises a wall mounting flange having first and second mounting plates, and wherein the first mounting plate of the wall mounting flange is slidably connected to the exterior surface of the third base sidewall along the upper rail, the lower rail, and the lateral stop to provide for quick mounting of the wall mounting flange to and removal from the base housing.

20. A apparatus of claim 19, wherein the second mounting plate of the wall mounting flange further includes at least one spike adapted to pierce the wall stud to connect the base housing to the wall stud of the building structure.

21. An apparatus of claim 20, wherein the second mounting plate of the wall mounting flange includes a plurality of slots adapted to allow for the passage of a plurality of stud connectors, and wherein the at least one spike is positioned substantially parallel to the third sidewall of the base housing.

22. An apparatus of claim 13, wherein the power outlet housing further includes a power outlet open front to provide access to the auxiliary inner chamber, and wherein the apparatus further comprises a power outlet cover plate positioned in the base inner chamber and positioned to overlie portions of the power outlet housing open front and inner surface portions of the base side wall and having a power outlet cover aperture extending therethrough to provide access to the at least one female power outlet when positioned in the auxiliary inner chamber of the power outlet housing.

23. An apparatus of claim 14, wherein the base open front includes an inner perimeter, and wherein the base housing includes a plurality of base housing cover plate supports positioned at least partially within the base inner chamber adjacent the inner perimeter of the base open front of the base housing to provide a mounting connection for the base housing cover plate to connect the base housing cover plate to the base housing adjacent the base open front of the base housing, the base housing cover plate to cover the base open front of the base housing and enclose the base inner chamber.

24. An apparatus of claim 13, wherein the plurality of base sidewalls of the base housing further includes a third base sidewall having a second female telephone jack aperture sized large enough to receive the female telephone jack, and wherein the second base sidewall of the base housing is one of a top and a bottom base sidewalls and the third base sidewall is the other of the top and the bottom base sidewalls.

25. An apparatus of claim 24, wherein the female telephone jack includes the proximal end, a distal end, and a body extending therebetween sized for and positioned in the female telephone jack aperture of one of the second and third base sidewalls and having a cavity for receiving at least one male telephone jack connector, the proximal end of the female telephone jack having a proximal surface extension to provide an inner stop, and the body having a plurality of side connectors to form an outer stop, the combination of the proximal surface extension and plurality of side connectors to provide a positive lock of the female telephone jack within the telephone jack aperture when so positioned.

26. An apparatus of claim 24, wherein at least one of the top base sidewall and bottom base sidewall includes a pre-scored surface adapted to be detached by a user to form the female telephone jack aperture defining a removable telephone jack knockout to thereby provide a user selectable aperture for connecting the female telephone jack to the base housing to accommodate at least one of top side and bottom side building structure telephone wiring.

27. An apparatus of claim 13, wherein the power outlet housing further includes a power outlet open front, a power outlet backwall, a plurality of power outlet sidewalls extending between the power outlet open front and the power outlet backwall, the auxiliary inner chamber therein positioned between the power outlet backwall and the plurality of power outlet sidewalls so that the power outlet open front provides access to the auxiliary inner chamber, wherein at least one of the plurality of power outlet sidewalls and the power outlet backwall includes a pre-scored surface adapted to be detached by a user to form the building structure alternating current electrical wiring aperture defining a removable electrical wiring knockout, and wherein the power outlet housing further includes a pair of external spaced apart protuberances positioned adjacent the building structure alternating current electrical wiring aperture to provide guidance for passage of the building structure alternating current electrical wiring through the alternating current electrical wiring aperture into the auxiliary inner chamber of the power outlet housing to conned to and supply electrical power to the alternating current female electrical power outlet.

28. An apparatus of claim 23, further comprising a plurality of base cover plate connectors, wherein the base housing cover plate includes a plurality of base housing cover plate connection apertures positioned to provide for the passage of the plurality of base housing cover plate connectors and positioned to align with the plurality of base housing cover plate supports when the base housing cover plate is positioned to cover the base open front of the base housing to thereby connect the base housing cover plate to the plurality of base housing cover plate supports, wherein the base housing cover plate has a front cover plate surface and an outer perimeter surrounding the front cover plate surface, and wherein at least a portion of the outer perimeter is deflected away from the front cover plate surface to further provide reduced wiring visualization and exposure when the base housing cover plate is positioned to cover the base open front of the base housing.

29. An apparatus of claim 22, wherein the first base sidewall of the base housing further includes a plurality of bores to provide a mounting connection for the power outlet cover plate to mount the power outlet cover plate to the first base sidewall of the base housing adjacent the at least one power outlet aperture of the base housing and to cover an outer periphery of the alternating current female electrical power outlet and enclose the auxiliary inner chamber of the power outlet housing between the base housing and the power outlet housing, and wherein the power outlet cover plate includes a plurality of power outlet connection apertures positioned to align with at least two flange apertures extending from the alternating current female electrical power outlet and at least two of the plurality of bores in the first base sidewall of the base housing to connect the power outlet cover plate and alternating current female electrical power outlet to the first base sidewall.

30. An apparatus comprising: a cordless telephone including a base station having a plurality of wall hanging slots adapted to mount the cordless telephone to an interior wall of a building structure; a combination base housing and power outlet housing, the base housing having a base open front, a base backwall, and a plurality of base sidewalls extending between the base open front and the base backwall, each of the plurality of base sidewalls having an exterior surface, the power outlet housing connected to the exterior surface of one of the plurality of base sidewalls of the base housing to thereby reduce overall depth of a combination of the base housing and the power outlet housing when recessed within the building structure; and a base housing cover plate including a plurality of cordless telephone base station mounts adapted to cover the base open front and adapted to connect to the plurality of wall hanging slots of the base station of the cordless telephone to thereby mount the cordless telephone to the interior wall of the building structure.

31. An apparatus of claim 30, wherein the base housing includes a base inner chamber positioned between the base backwall and plurality of base sidewalls such that the base open front provides access to the base inner chamber, wherein a female telephone jack and alternating current female electrical outlet are located at least partially within the base inner chamber of the base housing, and wherein the base housing cover plate is positioned to cover the base open front of the base housing to enclose major lengthwise extents of a telephone cord when connected to the female telephone jack and alternating current power cord when connected to the alternating current power plug such that the major lengthwise extents of the telephone cord and the alternating current power cord are not readily visible outside of the base housing.

32. An apparatus for mounting a cordless device to produce reduced wiring visualization and exposure, the apparatus comprising: a base housing having a base open front, a base backwall, and a plurality of base sidewalls extending between the base open front and the base backwall, and a base inner chamber therein positioned between the base backwall and plurality of base sidewalls so that the base open front provides access to the base inner chamber, the base open front being sized large enough to allow the passage into and storage in the inner chamber of an alternating current power plug and an alternating current powercord, at least one of the plurality of base sidewalls positioned transverse to and extending between the base open front and the base backwall and having at least one power outlet aperture; a power outlet housing connected to the first base sidewall and having an auxiliary inner chamber therein positioned to interface with the base inner chamber; and an alternating current female electrical power outlet positionable between the base inner chamber and the auxiliary inner chamber and removable therefrom for providing access to the auxiliary inner chamber from the base inner chamber to thereby reduce an overall depth of a combination of the base housing and the power outlet housing within at least one of a furniture and a building structure.

33. An apparatus of claim 32, further comprising a base housing cover plate positioned to cover the base open front of the base housing to enclose major lengthwise extents of the alternating current power cord when connected to the alternating current power plug within the base inner chamber of the base housing so that the major lengthwise extents of the alternating current power cord are not readily visible outside of the base housing, and wherein the base housing cover plate has at least one cord channel formed therein and adapted to allow passage of the alternating current power cord therethrough.

34. An apparatus of claim 33, wherein the base housing cover plate has means for mounting a base station of the cordless device to the base housing cover plate adapted to connect the base station to the base housing cover plate when the base housing cover plate is positioned to cover the base open front of the base housing.

35. An apparatus of claim 32, wherein the first base sidewall has an outer surface including a transversely extending upper rail, a lower rail substantially parallel to and spaced apart from the upper rail, the upper rail and lower rail having adjacent first and second ends, and a lateral stop adjacent one of the first and second ends of the upper and lower rails, wherein the power outlet housing includes an upper flange and a lower flange substantially parallel to and spaced apart from the upper flange and positioned adjacent the power outlet open front of the power outlet housing, and wherein the power outlet housing is slidably connected to the outer surface of the first base sidewall along the upper and lower flanges between the upper rail, lower rail, and lateral stop of the base housing to provide for quick mounting and removal of the power outlet housing from the base housing.

36. An apparatus of claim 32, wherein the plurality of base sidewalls of the base housing further includes a second base sidewall having an outer surface positioned opposite the first base sidewall of the base housing, and wherein the apparatus further comprises a mounting flange connected to the outer surface of the second base sidewall to thereby provide connection of the base housing to the at least one of a furniture and a building structure.

37. An apparatus of claim 32, wherein the plurality of base sidewalls further includes a second base sidewall having an exterior surface including a transversely extending upper rail, a lower rail substantially parallel to and spaced apart from the upper rail, the upper rail and lower rail having adjacent first and second ends, and a lateral stop adjacent an end of the upper and lower rails, wherein the apparatus further comprises a mounting flange having first and second mounting plates, and wherein the first mounting plate of the mounting flange is slidably connected to the exterior surface of the second base sidewall along the upper rail, the lower rail, and the lateral stop to provide for quick mounting of the mounting flange to and removal from the base housing.

38. An apparatus of claim 32, wherein the power outlet housing further includes a power outlet open front to provide access to the auxiliary inner chamber, and wherein the apparatus further comprises a power outlet cover plate positioned in the base inner chamber of the base housing and positioned to overlie portions of the power outlet open front of the power outlet housing and inner surface portions of the first base sidewall and having a power outlet cover aperture extending therethrough to provide access to the at least one female power outlet when positioned in the auxiliary inner chamber of the power outlet housing.

39. An apparatus of claim 33, wherein the plurality of base sidewalls also includes a top base sidewall positioned transverse to and extending between the base open front and the base backwall of the base housing and having a pre-scored surface adapted to be detached by a user to form a base inner chamber defining a removable base inner chamber knockout to thereby provide a user selectable aperture for at least one of connecting a female telephone jack to the base housing to accommodate mounting structure telephone wiring and venting residual heat generated by the alternating current power plug when positioned within the base inner chamber.

40. An apparatus of claim 33, further comprising means for connecting the base housing cover plate to the base housing including a quick disconnect means for disconnecting the base housing cover plate from the base housing without tools.

41. A method for mounting an outlet housing for a telephone in a building structure to provide reduced wiring visualization exposure, the method comprising the steps of: providing a base housing having a base open front, a base backwall, and a plurality of base sidewalls extending between the base open front and the base backwall forming a base inner chamber therein, the plurality of base sidewalls including a first base sidewall positioned transverse to and extending between the base open front and the base backwall and having at least one power outlet aperture to receive an alternating current female electrical power outlet therein;

providing a power outlet housing having a power outlet open front, a power outlet backwall, a plurality of power outlet sidewalls extending between the power outlet open front and the power outlet backwall forming an auxiliary inner chamber therein, and a wiring aperture extending from external the power outlet housing and one of the power outlet sidewalls and the power outlet backwall through to the auxiliary inner chamber; connecting the power outlet housing to the first base sidewall so that the power outlet open front interfaces with the at least one power outlet aperture of the first base sidewall to thereby reduce overall depth of the outlet housing within the building structure; affixing a power outlet within the outlet housing so that a front side having a socket faces the base inner chamber so as to be substantially flush with the first base sidewall, an outlet body contained within the auxiliary inner chamber and connectable to electrical wiring passed through the wiring aperture; and recessing the base housing and power outlet housing within an interior wall surface of the building structure.

42. A method of claim 41, further comprising the steps of: connecting a wall mounting flange having at least one stud connection spike to an exterior surface of a second sidewall of the plurality of sidewalls of the base housing opposite the first base sidewall of the plurality of base sidewalls; and mounting the base housing to a wall stud of the building structure by inserting the at least one stud connection spike into the wall stud of the building structure.

43. A method of claim 42, further comprising the steps of: connecting a female telephone jack to at least one of a top and a bottom base sidewall of the base housing having a female telephone jack aperture sized to receive the telephone jack; and connecting an alternating current female electrical power outlet at least partially within the base inner chamber of the base housing.

44. A method for installing a telephone in a building structure to provide reduced wiring visualization exposure, the method comprising the steps of: connecting a male telephone jack connector to a female telephone jack positioned in a base inner chamber of an outlet housing recessed within an interior wall of the building structure and having a base housing and a power outlet housing, by passing the male telephone jack connector through a base open front of the base housing to engage the female telephone jack; connecting an alternating current power plug to an alternating current female electrical power outlet having an outlet surface facing into the base housing and a power outlet body positioned within the power outlet housing, by passing the alternating current power plug through the base open front and engaging a socket of the alternating current female electrical power outlet; and positioning major lengthwise extents of a telephone cord connected to the male telephone jack connector and alternating current power cord connected to the alternating current power plug within the base inner chamber.

45. A method of claim 44, further comprising me step of: connecting a base housing cover plate for the base housing to a plurality of base housing cover plate connection supports positioned within a base inner chamber of the base housing to cover a base open front of the base housing, the base housing cover plate having at least one cord channel formed in a peripheral region of the base housing cover plate adapted to allow passage of the alternating current power cord and the telephone cord, therethrough.

46. A method for mounting cordless device hardware in a building structure to provide reduced wiring visualization exposure, the method comprising the steps of:

threading electrical wiring through an aperture in a power outlet housing mounted within a wall structure of a building;

passing the electrical wiring through the power outlet housing and into an inner chamber of a base housing removably connected to the power outlet housing;

pulling the electrical wiring out of an open front of the base housing in spaced relation from the building wall structure;

connecting the electrical wiring to an alternating current power outlet having at least one power outlet socket on a front face thereof;

positioning the alternating current power outlet in bridging relation between the base inner chamber and the power outlet housing, the front face of the alternating current power outlet facing into the base inner chamber and an outlet body extending rearward of the front face contained within the power outlet housing; and placing a cover plate over the base housing, the cover plate openable to provide access to the power outlet, thereby reducing an overall depth of a combination of the base housing and the power outlet housing within the building structure, and providing a significantly lower profile for the power outlet relative to the building wall structure.

* * * * *